(12) United States Patent
Cohen et al.

(10) Patent No.: US 11,018,967 B2
(45) Date of Patent: May 25, 2021

(54) DETERMINING AN END USER EXPERIENCE SCORE BASED ON CLIENT DEVICE, NETWORK, SERVER DEVICE, AND APPLICATION METRICS

(71) Applicant: VIAVI Solutions Inc., San Jose, CA (US)

(72) Inventors: Steven Cohen, Chanhassen, MN (US); Kallingal Sebas Jayanth Kishoor, Woodbury, MN (US); Todd Lange, Eagan, MN (US)

(73) Assignee: VIAVI Solutions Inc., San Jose, CA (US)

( * ) Notice: Subject to any disclaimer, the term of this patent is extended or adjusted under 35 U.S.C. 154(b) by 268 days.

(21) Appl. No.: 15/940,278

(22) Filed: Mar. 29, 2018

(65) Prior Publication Data
US 2019/0306044 A1   Oct. 3, 2019

(51) Int. Cl.
*G06F 16/955* (2019.01)
*H04L 12/26* (2006.01)
*H04L 29/08* (2006.01)

(52) U.S. Cl.
CPC .......... *H04L 43/0864* (2013.01); *H04L 43/04* (2013.01); *H04L 43/065* (2013.01); *H04L 67/22* (2013.01)

(58) Field of Classification Search
CPC .... H04L 43/0864; H04L 43/04; H04L 43/065
USPC ....................................................... 709/224
See application file for complete search history.

(56) References Cited

U.S. PATENT DOCUMENTS

| | | | |
|---|---|---|---|
| 8,849,994 B2 | 9/2014 | Roberts et al. | |
| 10,313,211 B1 * | 6/2019 | Rastogi | H04L 43/045 |
| 2009/0228585 A1 | 9/2009 | Kosbab et al. | |
| 2019/0086988 A1 * | 3/2019 | He | H04W 52/0225 |
| 2019/0239101 A1 * | 8/2019 | Ouyang | H04W 24/04 |
| 2019/0349426 A1 * | 11/2019 | Smith | H04L 67/104 |

OTHER PUBLICATIONS

New Relic, "Apdex: Measuring user satisfaction", https://docs.newrelic.com/docs/apm/new-relic-apm/apdex/apdex-measuring-user-satisfaction, 2008-2018, 4 pages.

* cited by examiner

Primary Examiner — Sibte H Bukhari
(74) Attorney, Agent, or Firm — Harrity & Harrity, LLP

(57) ABSTRACT

A device receives client delay metrics associated with a client device, network delay metrics associated with a network, server delay metrics associated with a server device, and application delay metrics associated with an application provided by the server device, wherein the client device and the server device communicate via the network. The device calculates client delay scores based on the client delay metrics, and calculates network delay scores based on the network delay metrics. The device calculates server delay scores based on the server delay metrics, and calculates application delay scores based on the application delay metrics. The device calculates an end user experience score based on the client delay scores, the network delay scores, the server delay scores, and the application delay scores, and performs an action based on the end user experience score.

20 Claims, 11 Drawing Sheets

DETERMINING AN END USER EXPERIENCE SCORE BASED ON CLIENT DEVICE, NETWORK, SERVER DEVICE, AND APPLICATION METRICS

BACKGROUND

End user experience (EUE) monitoring enables monitoring impacts of device, network, and/or application performance from a point of view of an end user. Some metrics that are used for estimating EUE quality include a round-trip network delay (RTND) metric, an application delay metric, a data delivery time metric, a retransmissions metric, a zero windows metric, and/or the like. However, each of these metrics may not be useful for estimating EUE quality.

The RTND metric may not be useful for estimating EUE quality since large network latency alone may not be correctable, and may be partially compensated for by large transmission control protocol (TCP) windows or better application implementation. The application delay metric may not be useful for estimating EUE quality since an end user may expect an application delay, and the application delay may not provide an indication that differentiates between server device congestion, server device processing, and backend processing. The data delivery time metric may not be useful for estimating EUE quality since an end user may expect a data delivery time delay, and the data delivery time delay does not provide an indication of whether a data delivery time is degraded. The retransmissions metric may not be useful for estimating EUE quality since retransmissions are a normal part of TCP flow control and an end user will not be aware of lost packets caused by retransmissions. The zero windows metric may not be useful for estimating EUE quality since congestion control may render the zero windows metric useless.

SUMMARY

According to some implementations, a device may include one or more memories, and one or more processors, communicatively coupled to the one or more memories, configured to receive client delay metrics associated with a client device, and receive network delay metrics associated with a network. The one or more processors may receive server delay metrics associated with a server device, and may receive application delay metrics associated with an application provided by the server device, wherein the client device and the server device may communicate via the network. The one or more processors may calculate one or more client delay scores based on the client delay metrics, where the one or more client delay scores may provide indications of delays caused by the client device, and may calculate one or more network delay scores based on the network delay metrics, where the one or more network delay scores may provide indications of delays caused by the network. The one or more processors may calculate one or more server delay scores based on the server delay metrics, where the one or more server delay scores may provide indications of delays caused by the server device, and may calculate one or more application delay scores based on the application delay metrics, where the one or more application delay scores may provide indications of delays caused by the application. The one or more processors may calculate an end user experience score based on the one or more client delay scores, the one or more network delay scores, the one or more server delay scores, and the one or more application delay scores, and may perform an action based on the end user experience score.

According to some implementations, a non-transitory computer-readable medium may store instructions that include one or more instructions that, when executed by one or more processors, cause the one or more processors to receive client delay metrics, where the client delay metrics may provide information associated with a client device. The one or more instructions may cause the one or more processors to receive network delay metrics, where the network delay metrics may provide information associated with a network, and receive server delay metrics, where the server delay metrics may provide information associated with a server device. The one or more instructions may cause the one or more processors to receive application delay metrics, where the application delay metrics may provide information associated with an application provided by the server device, and the client device and the server device may communicate via the network. The one or more instructions may cause the one or more processors to determine one or more client delay scores based on the client delay metrics, where the one or more client delay scores may provide indications of delays associated with the client device, and determine one or more network delay scores based on the network delay metrics, where the one or more network delay scores may provide indications of delays associated with the network. The one or more instructions may cause the one or more processors to determine one or more server delay scores based on the server delay metrics, where the one or more server delay scores may provide indications of delays associated with the server device, and determine one or more application delay scores based on the application delay metrics, where the one or more application delay scores may provide indications of delays associated with the application. The one or more instructions may cause the one or more processors to calculate an end user experience score based on the one or more client delay scores, the one or more network delay scores, the one or more server delay scores, and the one or more application delay scores, and perform an action based on the end user experience score.

According to some implementations, a method may include receiving, by a device metrics associated with a client device, metrics associated with a network, metrics associated with a server device, and metrics associated with an application provided by the server device, wherein the client device and the server device may communicate via the network. The method may include calculating, by the device, one or more client delay scores based on the metrics associated with the client device, where the one or more client delay scores may provide indications of delays associated with the client device, and calculating, by the device, one or more network delay scores based on the metrics associated with the network, where the one or more network delay scores may provide indications of delays associated with the network. The method may include calculating, by the device, one or more server delay scores based on the metrics associated with the server, where the one or more server delay scores may provide indications of delays associated with the server device, and calculating, by the device, one or more application delay scores based on the metrics associated with the application, where the one or more application delay scores may provide indications of delays associated with the application. The method may include calculating, by the device, an end user experience score based on the one or more client delay scores, the one or more network delay scores, the one or more server delay scores, and the one or more application delay scores, and performing, by the device, an action based on the end user experience score.

DETAILED DESCRIPTION

The following detailed description of example implementations refers to the accompanying drawings. The same reference numbers in different drawings may identify the same or similar elements.

The metrics used for estimating EUE quality (e.g., the RTND metric, the application delay metric, the data delivery time metric, the retransmissions metric, the zero windows metric, and/or the like) do not provide an indication of a cause of EUE quality degradation. For example, the metrics do not provide an indication of whether the EUE quality degradation is caused by a client device, a server device communicating with the client device, an application executing on the server device and being utilized by the client device, or a network interconnecting the client device and the server device.

Some implementations described herein provide a scoring platform that determines an end user experience score based on client device, network, server device, and application metrics (e.g., key performance indicators (KPIs)). For example, the scoring platform may receive client delay metrics associated with a client device, server delay metrics associated with a server device communicating with the client device, application delay metrics associated with an application executing on the server device and being utilized by the client device, and network delay metrics associated with a network interconnecting the client device and the server device. The score platform may calculate client delay scores, server delay scores, application delay scores, and network delay scores based on the client delay metrics, the server delay metrics, the application delay metrics, and the network delay metrics, respectively. The scoring platform may generate a final end user experience (EUE) score based on the client delay scores, the server delay scores, the application delay scores, and the network delay scores. The scoring platform may perform an action based on the final EUE score, the client delay scores, the server delay scores, the application delay scores, and/or the network delay scores.

Figure 1A:
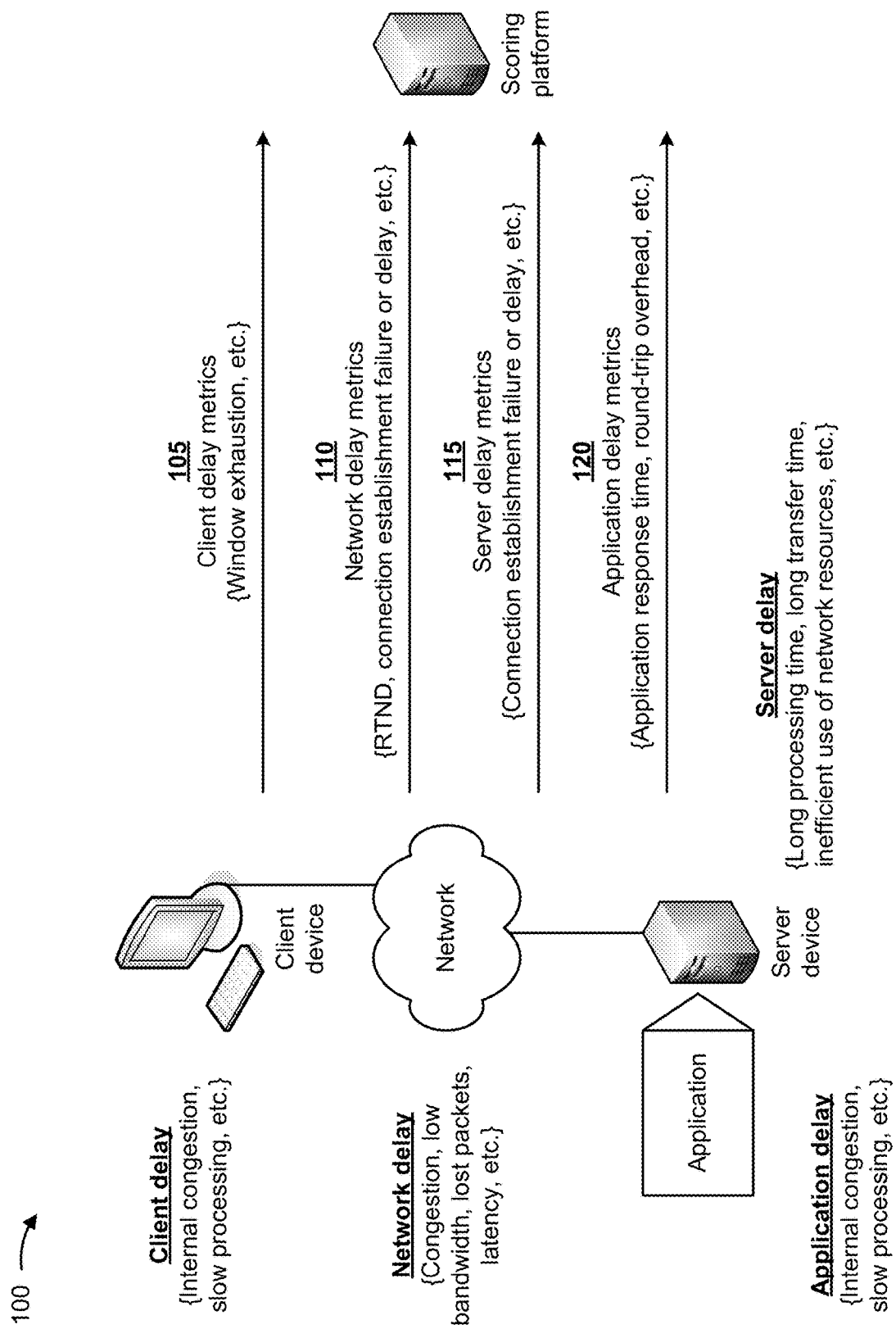
FIGS. 1A-1H are diagrams of an overview of an example implementation described herein.

FIGS. 1A-1H are diagrams of an overview of an example implementation 100 described herein. As shown in FIG. 1A, a client device may be associated with a network, a server device (e.g., executing an application), and a scoring platform. Assume that the client device communicates with the server device and the application, via the network. As further shown in FIG. 1A, events may occur that cause delays at the client device and diminish an end user experience (e.g., of a user of the client device). For example, the client device may experience events, such as internal processing congestion, slow processing (e.g., signaled by a zero window, which is when a window size in the client device remains at zero for a specified amount of time and the client device is not able to receive further information), and/or the like. In some implementations, a zero window may occur when the window size never reaches zero, and the scoring platform may include times when the window size does not reach zero but reaches a low value that inhibits another end (e.g., the client device or the server device) from sending more data.

In some implementations, the application may be spread across multiple load-balanced server devices and/or may be provided in the the client device. In some implementations, the client device may include front end applications, such as, a file transfer protocol (FTP) application, a storage area network (SAN) application, and/or the like. In such implementations, if the SAN application encounters degradation, the application may experience delay.

As further shown in FIG. 1A, events may occur that cause delays in the network and diminish the end user experience. For example, the network may experience events, such as network congestion, low bandwidth in the network, lost packets in the network, latency in the network, and/or the like. As further shown in FIG. 1A, events may occur that cause delays at the server device and diminish the end user experience. For example, the server device may experience events, such as internal processing congestion, slow processing (e.g., signaled by a zero window, described elsewhere herein), and/or the like. As further shown in FIG. 1A, events may occur that cause delays associated with the application and diminish the end user experience. For example, the application may experience events, such as long processing time by the application, long transfer time associated with the application, inefficient use of network resources by the application, and/or the like.

As further shown in FIG. 1A, and by reference number 105, the scoring platform may receive (e.g., from network probes) client delay metrics associated with the client device. In some implementations, the client delay metrics may include metrics that provide indications of the client delay experienced at the client device. For example, the client delay metrics may include a window exhaustion metric, a bulk data transfer exhausted window metric, a bulk data transfer time metric, and/or the like, as described elsewhere herein. In some implementations, an exhausted window may include a sender (e.g., the client device or the server device) perspective that a window has been used up, even if the zero window condition never actually occurs.

As further shown in FIG. 1A, and by reference number 110, the scoring platform may receive (e.g., from network probes) network delay metrics associated with the network. In some implementations, the network delay metrics may include metrics that provide indications of the network delay experienced in the network. For example, the network delay metrics may include a round trip network delay (RTND) metric, a connections metric, a connection establishment failure count metric, a connection establishment failure time metric, a connection establishment delay time metric, a connection establishment delay count metric, a connection establishment delay SynAckBeforeSyn count metric, a retransmissions metric, a data transfer time metric, a data transfer retransmission time metric, a data transfer bytes metric, a retransmitted packets metric, a total packets metric, a data packets metric, and/or the like, as described elsewhere herein.

As further shown in FIG. 1A, and by reference number 115, the scoring platform may receive (e.g., from network probes) server delay metrics associated with the server device. In some implementations, the server delay metrics may include metrics that provide indications of the server delay experienced at the server device. For example, the server delay metrics may include the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, as described elsewhere herein.

As further shown in FIG. 1A, and by reference number 120, the scoring platform may receive (e.g., from network probes) application delay metrics associated with the application and/or the server device. In some implementations, the application delay metrics may include metrics that provide indications of the application delay experienced at the application and/or the server device. For example, the application delay metrics may include an application response time metric, a total application turn delay metric (e.g., application turn is a request/response pair, where for each turn the application must wait the full round trip delay, and the greater the number of turns, the worse the application will perform), a total transaction time metric, the connections metric, a high application turn rate metric, an application turn RTND total metric, an application data in-flight metric, a transfer opportunity delay metric, and/or the like, as described elsewhere herein.

Figure 1B:
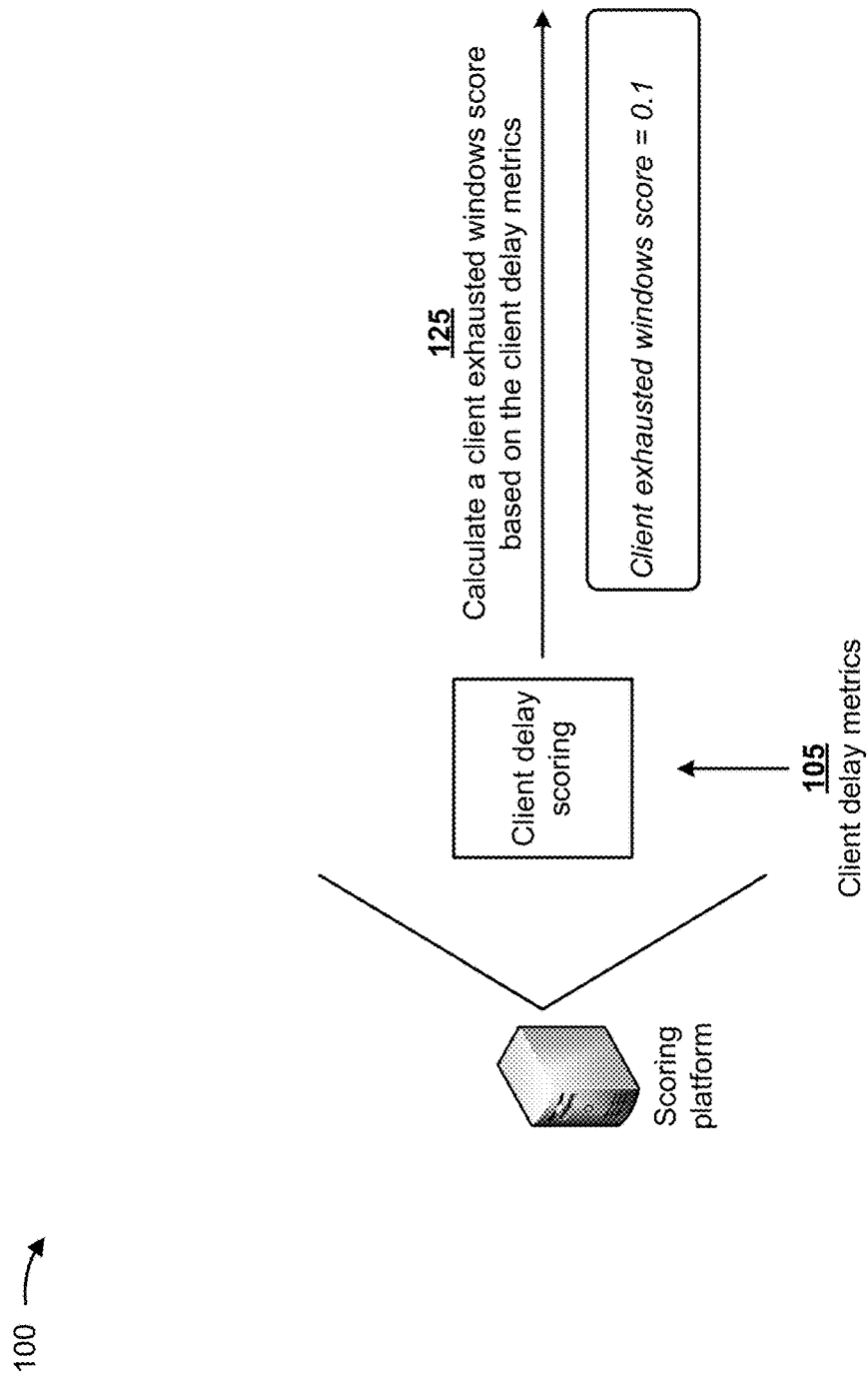

As shown in FIG. 1B, and by reference numbers 105 and 125, the scoring platform may calculate a client exhausted windows score based on the client delay metrics. In some implementations, the scoring platform may utilize the window exhaustion metric, the bulk data transfer exhausted window metric, the bulk data transfer time metric, and/or the like, to calculate the client exhausted windows score, as described elsewhere herein. In some implementations, the client exhausted windows score (e.g., shown as 0.1 in FIG. 1B) may provide a measure of delay associated with exhausted windows experienced by the client device.

Figure 1C:
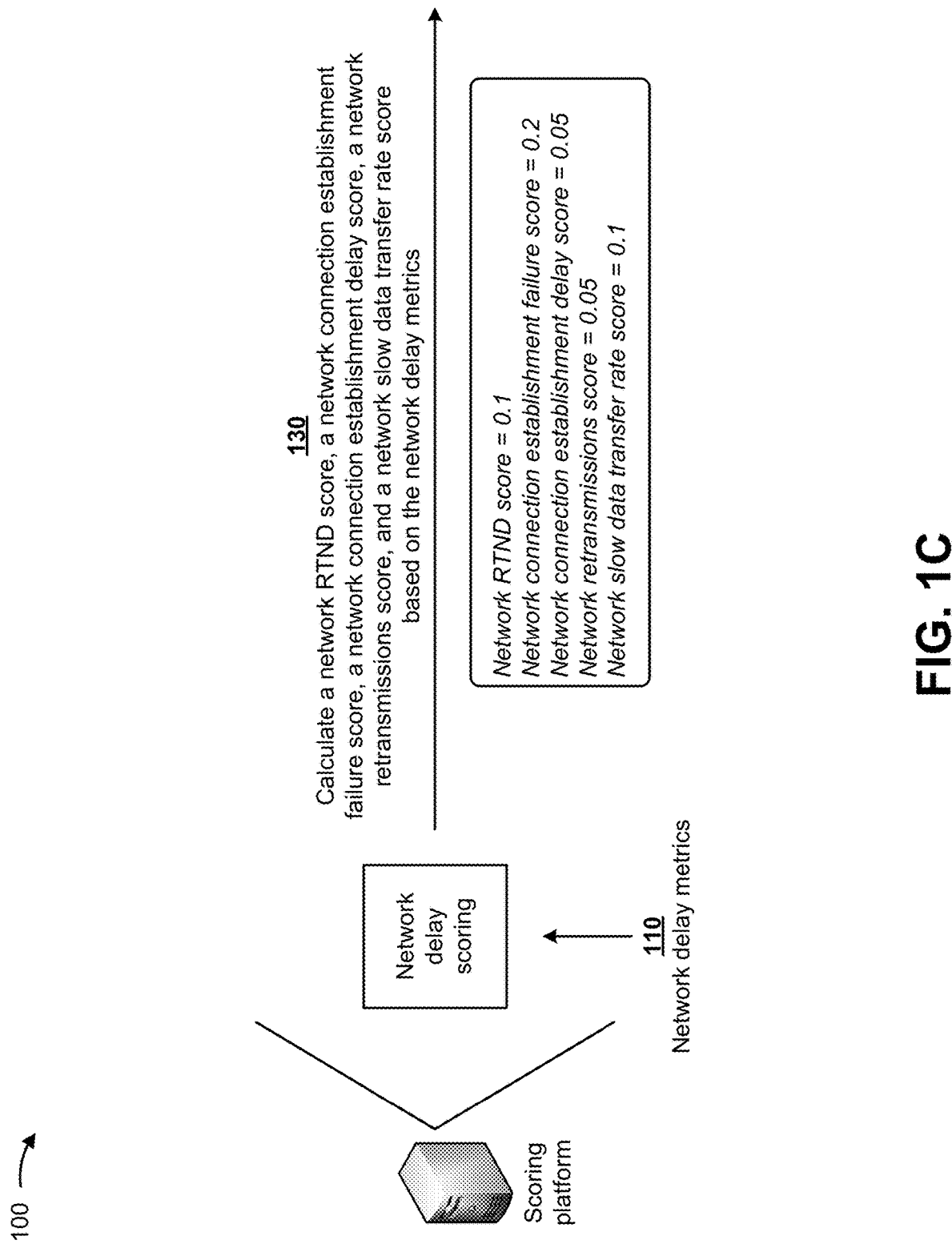

As shown in FIG. 1C, and by reference numbers 110 and 130, the scoring platform may calculate a network RTND score, a network connection establishment failure score, a network connection establishment delay score, a network retransmissions score, and/or a network slow data transfer rate score based on the network delay metrics. In some implementations, the scoring platform may utilize the RTND metric, the connections metric, the connection establishment failure count metric, the connection establishment failure time metric, the connection establishment delay time metric, the connection establishment delay count metric, the connection establishment delay SynAckBeforeSyn count metric, the retransmissions metric, the data transfer time metric, the data transfer bytes metric, the retransmitted packets metric, the total packets metric, the data packets metric, and/or the like, to calculate the network RTND score, the network connection establishment failure score, the network connection establishment delay score, the network retransmissions score, and/or the network slow data transfer rate score, as described elsewhere herein.

For example, as further shown in FIG. 1C, the scoring platform may calculate a network RTND score (e.g., shown as 0.1 in FIG. 1C), a network connection establishment failure score (e.g., shown as 0.2 in FIG. 1C), a network connection establishment delay score (e.g., shown as 0.05 in FIG. 1C), a network retransmissions score (e.g., shown as 0.05 in FIG. 1C), and a network slow data transfer rate score (e.g., shown as 0.1 in FIG. 1C), based on the network delay metrics.

Figure 1D:
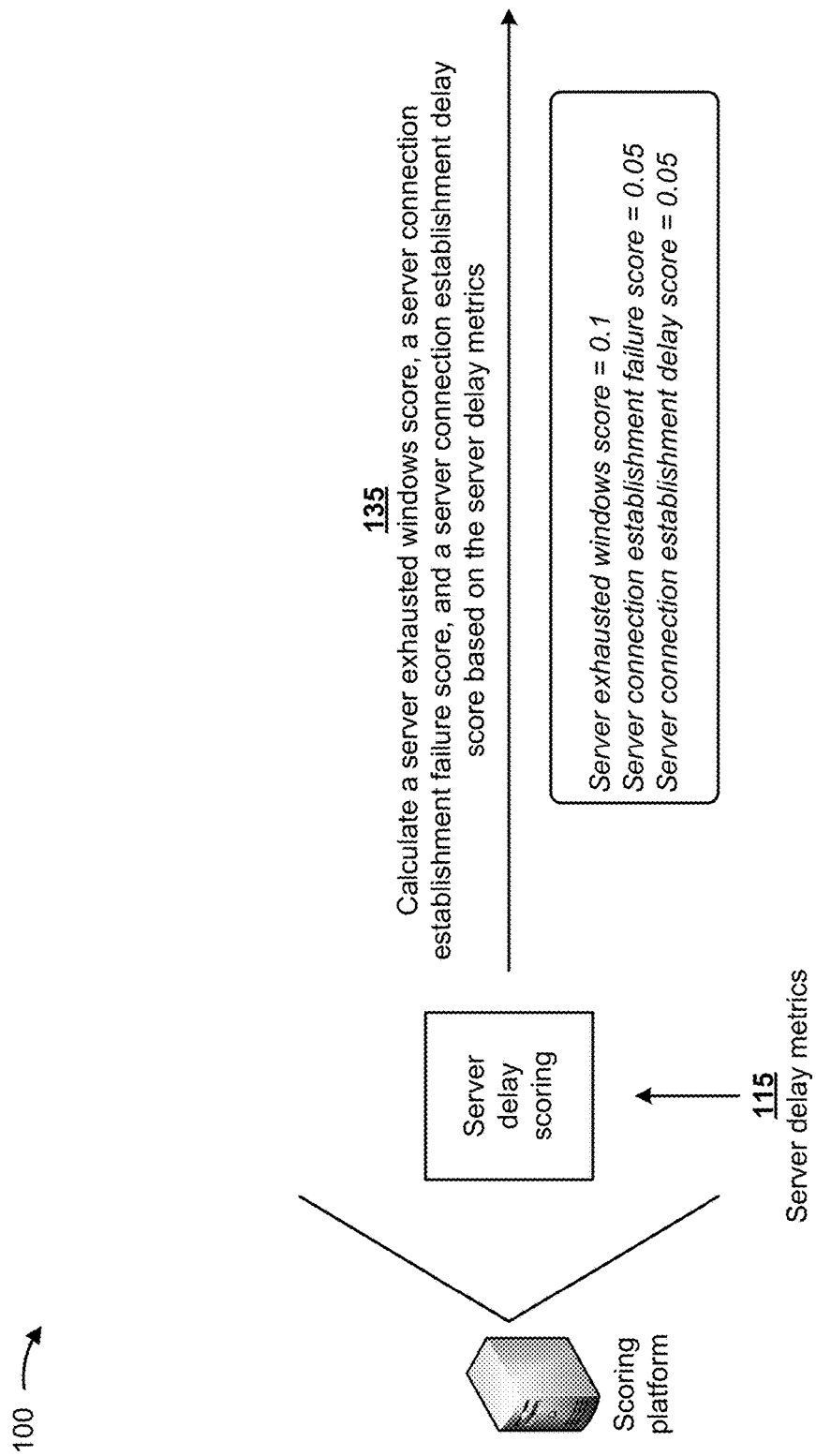

As shown in FIG. 1D, and by reference numbers 115 and 135, the scoring platform may calculate a server exhausted windows score, a server connection establishment failure score, and/or a server connection establishment delay score based on the server delay metrics. In some implementations, the scoring platform may utilize the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, to calculate the server exhausted windows score, the server connection establishment failure score, and/or the server connection establishment delay score, as described elsewhere herein.

For example, as further shown in FIG. 1D, the scoring platform may calculate a server exhausted windows score (e.g., shown as 0.1 in FIG. 1D), a server connection establishment failure score (e.g., shown as 0.05 in FIG. 1D), and a server connection establishment delay score (e.g., shown as 0.05 in FIG. 1D), based on the server delay metrics.

Figure 1E:
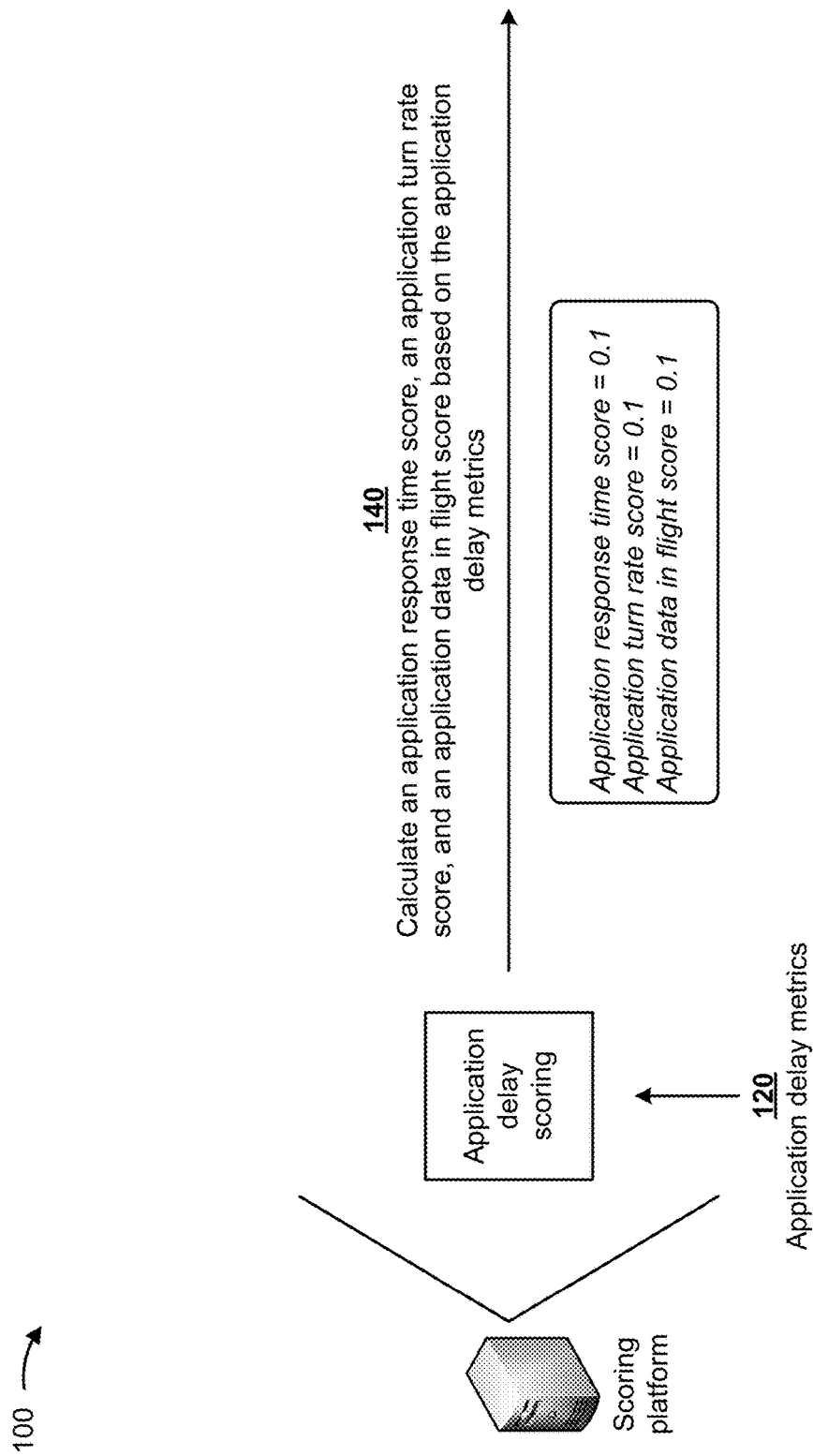

As shown in FIG. 1E, and by reference numbers 120 and 140, the scoring platform may calculate an application response time score, an application turn rate score, and/or an application data in flight score based on the application delay metrics. In some implementations, the scoring platform may utilize the application response time metric, the total application turn delay metric, the total transaction time metric, the connections metric, the high application turn rate metric, the application turn RTND total metric, the application data in-flight metric, the transfer opportunity delay metric, and/or the like, to calculate the application response time score, the application turn rate score, and/or the application data in flight score, as described elsewhere herein.

For example, as further shown in FIG. 1E, the scoring platform may calculate an application response time score (e.g., shown as 0.1 in FIG. 1E), an application turn rate score (e.g., shown as 0.1 in FIG. 1E), and an application data in flight score (e.g., shown as 0.1 in FIG. 1E), based on the application delay metrics.

Figure 1F:
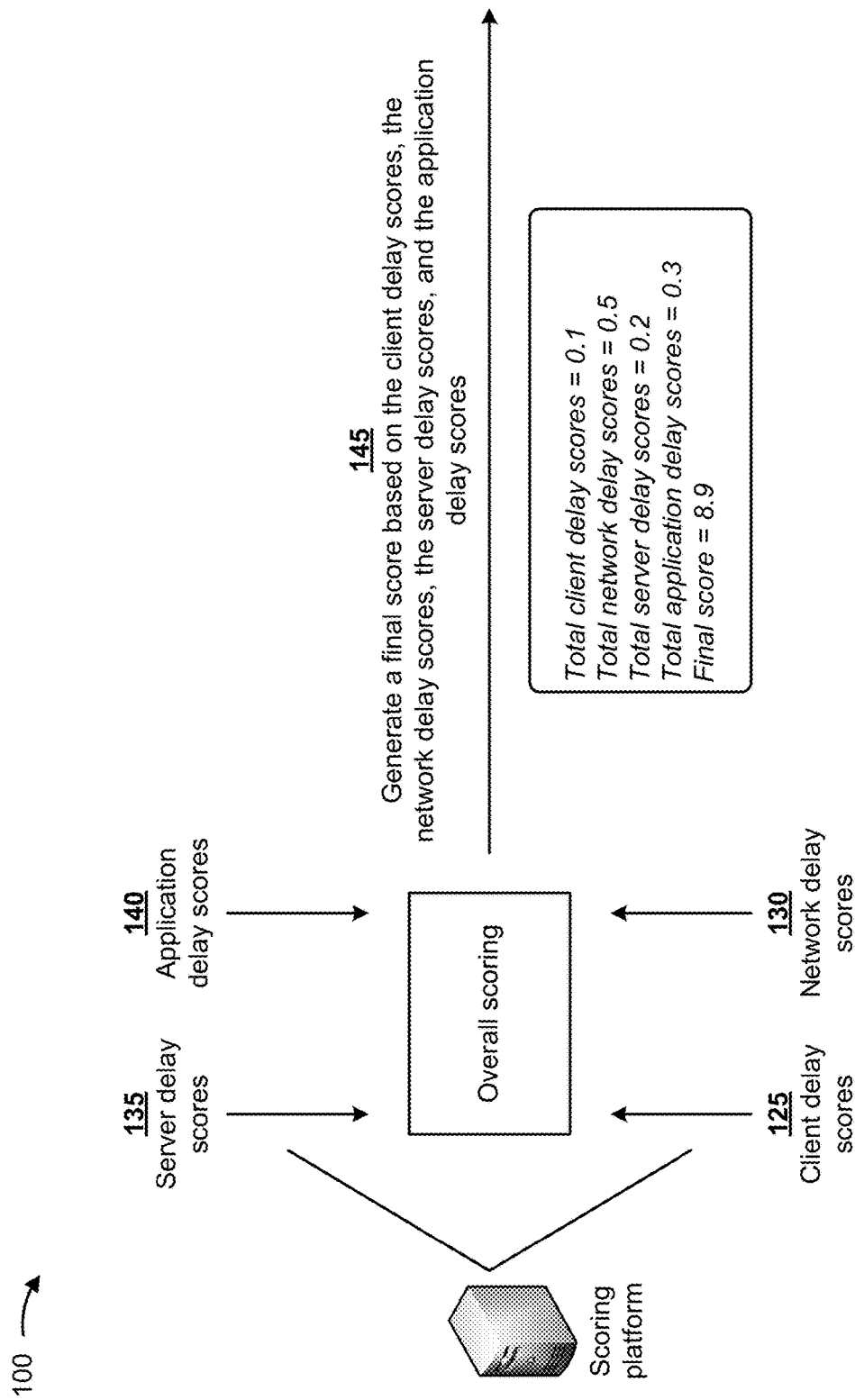

As shown in FIG. 1F, and by reference numbers 125, 130, 135, 140, and 145, the scoring platform may generate a final score (e.g., a final end user experience (EUE) score) based on the client delay scores, the network delay scores, the server delay scores, and the application delay scores. In some implementations, the scoring platform may set an initial score to a particular value (e.g., 10.0), and may deduct the client delay scores, the network delay scores, the server delay scores, and the application delay scores, from the particular value, to generate the final score.

As further shown in FIG. 1F, in example implementation 100, the scoring platform may utilize the client exhausted windows score (e.g., 0.1) as the total client delay score (e.g., 0.1). In example implementation 100, the scoring platform may add the network RTND score (e.g., 0.1), the network connection establishment failure score (e.g., 0.2), the network connection establishment delay score (e.g., 0.05), the network retransmissions score (e.g., 0.05), and the network slow data transfer rate score (e.g., 0.1) to determine the total network delay score (e.g., 0.5=0.1+0.2+0.05+0.05+0.1). In example implementation 100, the scoring platform may add the server exhausted windows score (e.g., 0.1), the server connection establishment failure score (e.g., 0.05), and the server connection establishment delay score (e.g., 0.05) to determine the total server delay score (e.g., 0.2=0.1+0.05+ 0.05). In example implementation 100, the scoring platform may add the application response time score (e.g., 0.1), the application turn rate score (e.g., 0.1), and the application data in flight score (e.g., 0.1) to determine the total application delay score (e.g., 0.3=0.1+0.1+0.1). In some implementations, the scoring platform may determine the final score based on a function (e.g., addition, subtraction, multiplication, weighting, combining, adding them and subtracting from an initial score, and/or the like) of the total client delay score, the total network delay score, the total server delay score, and the total application delay score. For example, the scoring platform may subtract the client delay scores (e.g., 0.1), the network delay scores (e.g., 0.5), the server delay scores (e.g., 0.2), and the application delay scores (e.g., 0.3), from the initial score (e.g., 10.0), to generate the final score (e.g., 8.9=10.0−0.1−0.5−0.2−0.3).

In some implementations, one or more of the total client delay score, the total network delay score, the total server delay score, or the total application delay score may be calculated by subtracting, from a predetermined number (e.g., ten), the sum of the scores (e.g., deductions) associated with each of the client device, the network, the server device, and the application, respectively. In such implementations, the final score may be determined as a minimum of the total client delay score, the total network delay score, the total server delay score, and the total application delay score. For example, if the total client delay score, the total network delay score, the total server delay score, and the total application delay score are 4.0, 10.0, 3.0, and 10.0, respectively, then the final score may be 3.0 (e.g., the minimum of the four scores).

Figure 1G:
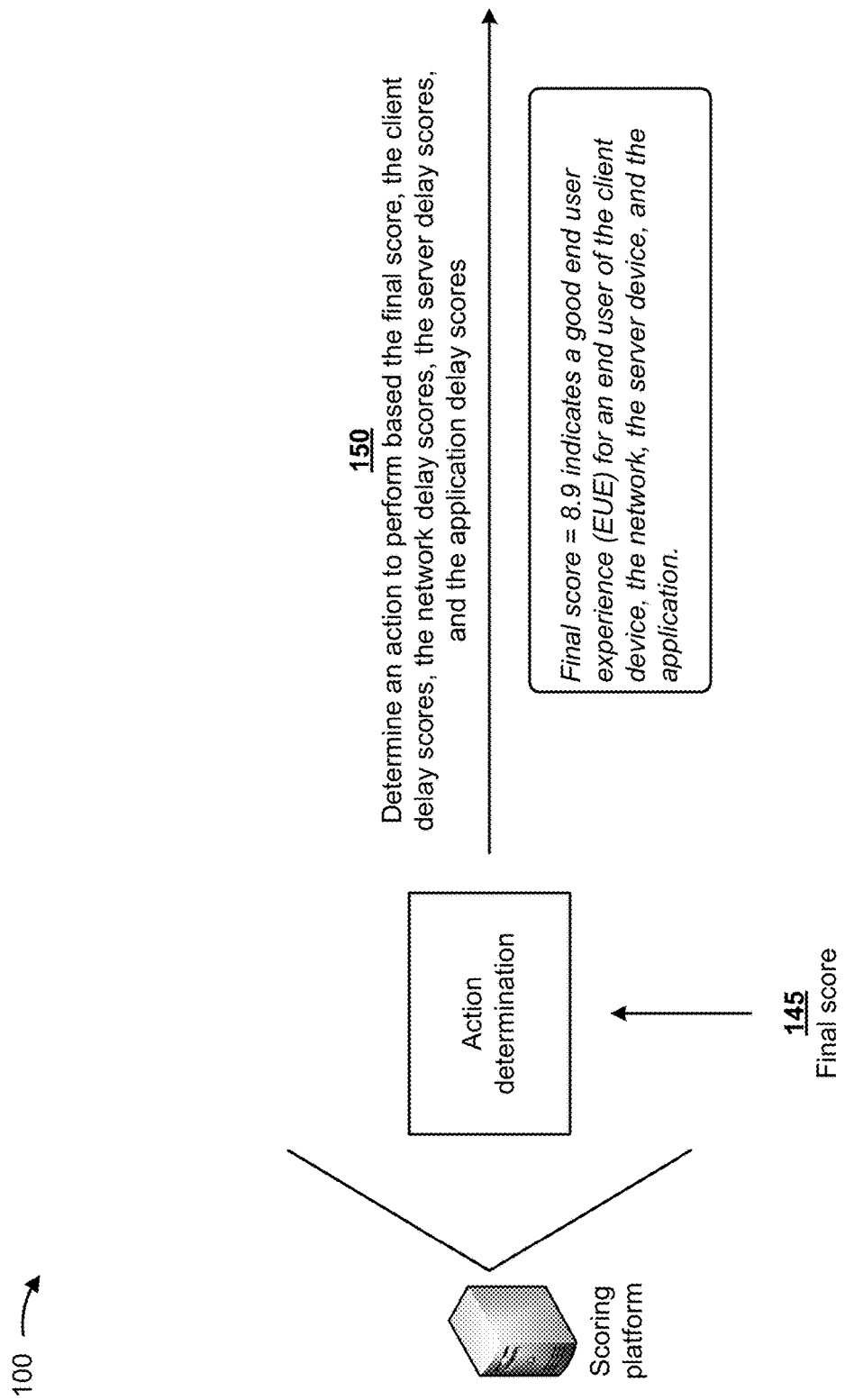

As shown in FIG. 1G, and by reference numbers 145 and 150, the scoring platform may determine an action to perform based on the final score, the client delay scores, the network delay scores, the server delay scores, and/or the application delay scores. In some implementations, the scoring platform may generate information indicating the final score and whether the final score indicates a poor end user experience, a marginal end user experience, a good end user experience, and/or the like. For example, as further shown in FIG. 1G, the scoring platform may generate information stating that a "final score=8.9 indicates a good end user experience (EUE) for an end user of the client device, the network, the server device, and the application." In some implementations, the scoring platform may determine one or more other actions to perform, as disclosed elsewhere herein.

Figure 1H:
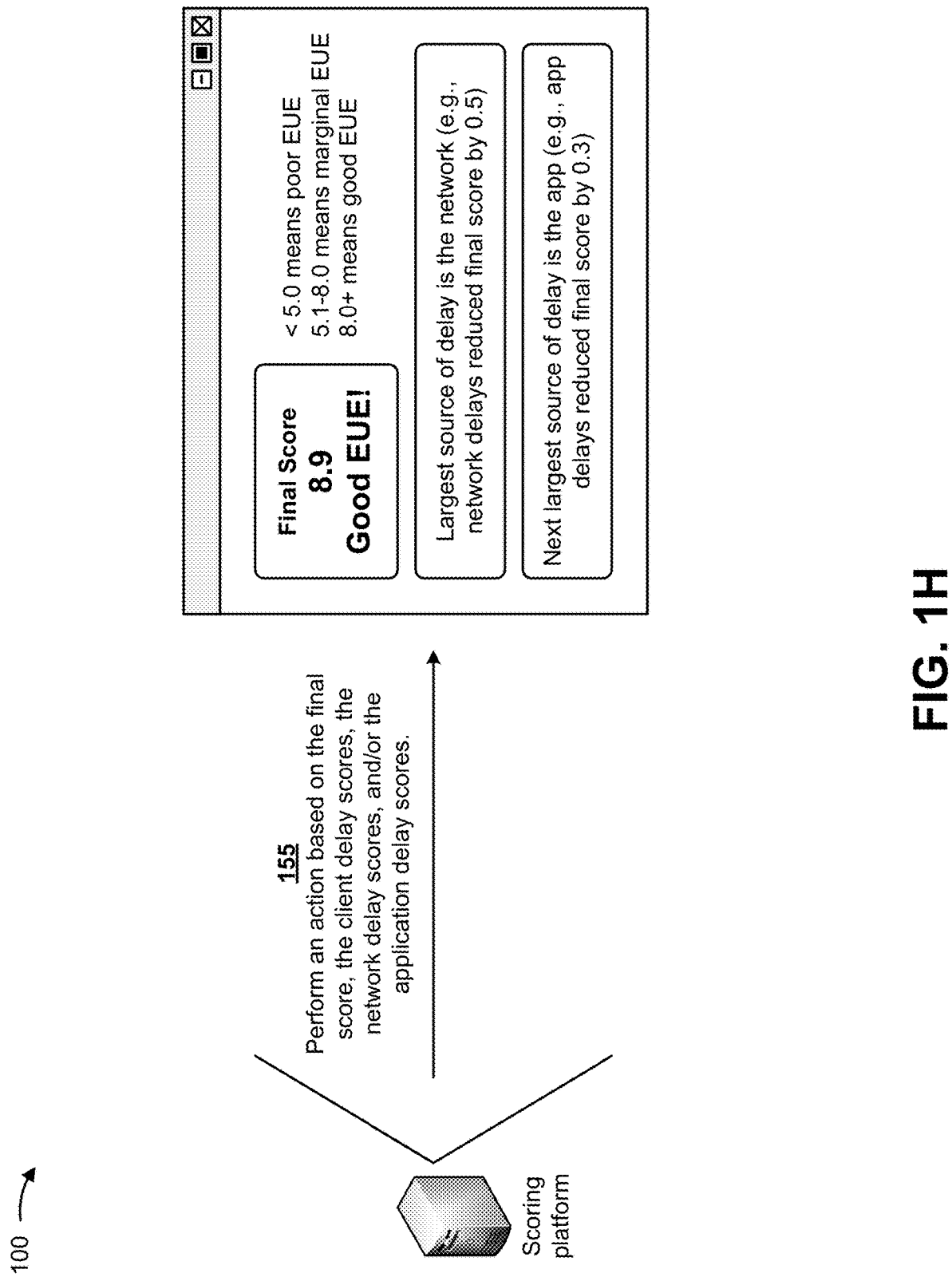

As shown in FIG. 1H, and by reference number 155, the scoring platform may perform the action determined based on the final score, the client delay scores, the network delay scores, the server delay scores, and/or the application delay scores. For example, as further shown in FIG. 1H, the scoring platform may generate a user interface that includes information indicating the final EUE score of "8.9," information indicating that the final EUE score is a good EUE, information indicating ranges for poor EUE, marginal EUE, and good EUE, information indicating that a largest source of delay is the network (e.g., since network delays reduced the final score by 0.5), information indicating that a next largest source of delay is the application (e.g., since application delays reduced the final score by 0.3), and/or the like. Such information may be provided an entity responsible for the client device, the server device, the application, and/or the network, and may be utilized to correct any problems identified (e.g., by the scores) with the client device, the server device, the application, and/or the network. In some implementations, the scoring platform may perform one or more other actions, as disclosed elsewhere herein.

In this way, several different stages of the process for determining an end user experience (e.g., an end user experience score) based on client device, network, server device, and application metrics are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, unlike implementations described herein, prior methodologies do not provide an indication of a cause of EUE quality degradation. Finally, automating the process for determining an end user experience based on client device, network, server device, and application metrics conserves computing resources (e.g., processor resources, memory resources, and/or the like) that would otherwise be wasted in attempting to generate information indicating the end user experience. In some implementations, the scoring platform may handle thousands, millions, billions, or more metrics received from hundreds, thousands, or more client devices, server devices, applications, and/or networks, and thus, addresses a big data issue.

Furthermore, in this way, implementations described herein address the problem of metrics that do not provide an indication of a cause of EUE quality degradation. Implementations described herein merge together metrics of various dimensionalities into a single, dimensionless metric that is easy to understand, increases an ability to determine whether an end user experience is good or bad (e.g., without manual correlation), and/or the like. Implementations described herein provide an EUE scoring system that may be applied across a variety of domains.

As indicated above, FIGS. 1A-1H are provided merely as examples. Other examples are possible and may differ from what was described with regard to FIGS. 1A-1H.

Figure 2:
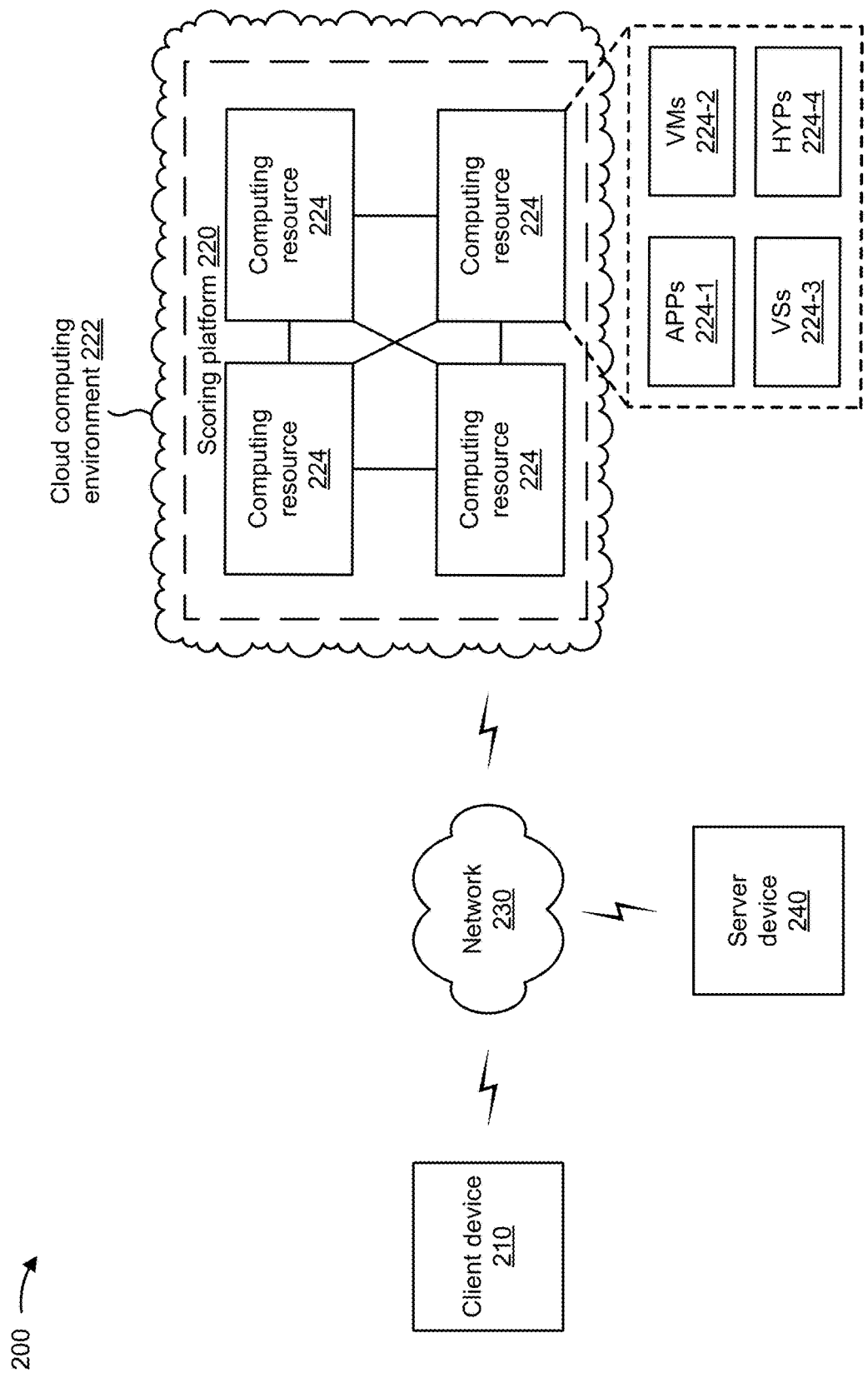
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a scoring platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, client device 210 may receive information from and/or transmit information to scoring platform 220 and/or server device 240.

Scoring platform 220 includes one or more devices that determine an end user experience score based on metrics associated with client device 210, network 230, server device 240, and applications provided by server device 240. In some implementations, scoring platform 220 may be designed to be modular such that certain software components may be swapped in or out depending on a particular need. As such, scoring platform 220 may be easily and/or quickly reconfigured for different uses. In some implementations, scoring platform 220 may receive information from and/or transmit information to one or more client devices 210 and/or server devices 240.

In some implementations, as shown, scoring platform 220 may be hosted in a cloud computing environment 222. Notably, while implementations described herein describe scoring platform 220 as being hosted in cloud computing environment 222, in some implementations, scoring platform 220 may not be cloud-based (i.e., may be implemented outside of a cloud computing environment) or may be partially cloud-based.

In some implementations, scoring platform 220 may be implemented in a server device that includes a network interface or capture card from which packets are sniffed. The packets may be provided to the server device from a network tap, a switch port analyzer (SPAN) port, a packet broker, and/or the like. The server device may provide the scores, described herein, to a separate computing device, or the separate computing device may calculate the scores based on the metrics calculated by the server device.

Cloud computing environment 222 includes an environment that hosts scoring platform 220. Cloud computing environment 222 may provide computation, software, data access, storage, etc. services that do not require end-user knowledge of a physical location and configuration of system(s) and/or device(s) that hosts scoring platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host scoring platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with scoring platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of scoring platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a server device, a group of server devices, or a similar type of device, which provides one or more applications to client device 210. In some implementations, server device 240 may receive information from and/or transmit information to client device 210 and/or scoring platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
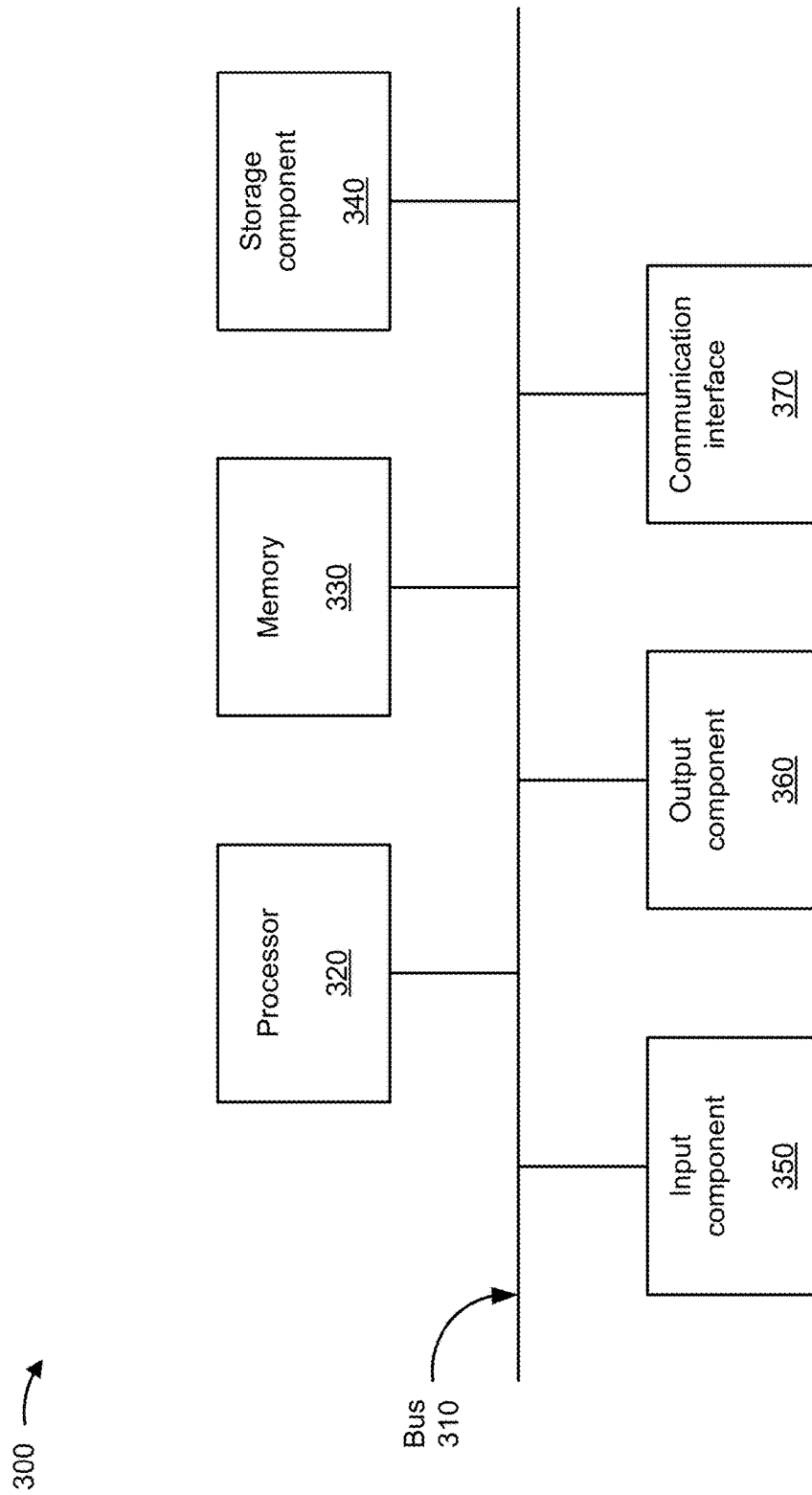
FIG. 3 is a diagram of example components of one or more devices of FIG. 2.

FIG. 3 is a diagram of example components of a device 300. Device 300 may correspond to client device 210, scoring platform 220, computing resource 224, and/or server device 240. In some implementations, client device 210, scoring platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
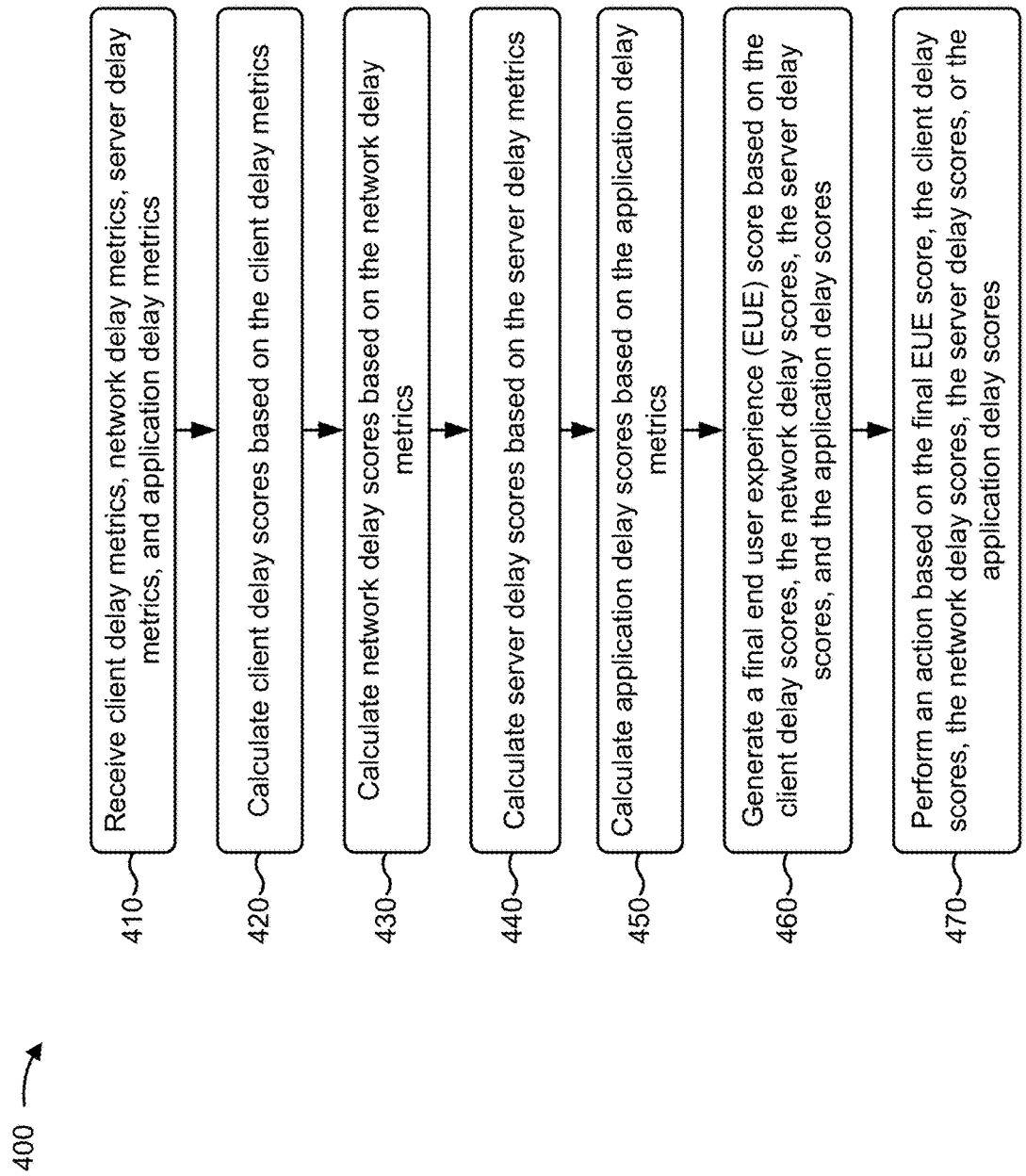
FIG. 4 is a flow chart of an example process for determining an end user experience score based on client device, network, server device, and application metrics.

FIG. 4 is a flow chart of an example process 400 for determining an end user experience score based on client device, network, server device, and application metrics. In some implementations, one or more process blocks of FIG. 4 may be performed by a scoring platform, such as scoring platform 220. In some implementations, one or more process blocks of FIG. 4 may be performed by another device or a group of devices separate from or including scoring platform 220, such as client device 210 and/or server device 240.

As shown in FIG. 4, process 400 may include receiving client delay metrics, network delay metrics, server delay metrics, and application delay metrics (block 410). For example, the scoring platform (e.g., using computing resource 224, processor 320, communication interface 370, and/or the like) may receive client delay metrics associated with a client device (e.g., client device 210), network delay metrics associated with a network (e.g., network 230), server delay metrics associated with a server device (e.g., server device 240), and application delay metrics associated with an application executing on the server device.

In some implementations, network probes may receive network packets associated with the client device, the server device, the network, and/or the application, and may calculate the client delay metrics, the server delay metrics, the network delay metrics, and/or the application delay metrics based on the network packets, timing information associated with the packets, inter-arrival times associated with the packets, times between specifically identified packets, and/or the like. In such implementations, the scoring platform may receive the client delay metrics, the server delay metrics, the network delay metrics, and/or the application delay metrics from the network probes.

In some implementations, the client delay metrics may include metrics that provide indications of the client delay experienced at the client device. For example, the client delay metrics may include a window exhaustion metric, a bulk data transfer exhausted window metric, a bulk data transfer time metric, and/or the like.

In some implementations, the window exhaustion metric may include a quantity of packet delays that can be attributed to exhausted or zero windows (e.g., when a window size in the client device remains at zero for a specified amount of time and the client device is not able to receive further information). In some implementations, exhausted window delays may accumulate when packet deltas exceed a predetermined time (e.g., ten milliseconds), a connection is in an established bulk data transfer period, and the connection is in a low window size state (e.g., less than 25% of a maximum). In some implementations, the window exhaustion metric may include a metric that determines if a window of the client device is perceived by the server device to be zero or near zero by adjusting for network delays and projecting how many bytes have been transmitted since a last window indication from the client device would have reached the server device. A similar approach may be applied to the transfer opportunity delay metric, described elsewhere herein.

In some implementations, the bulk data transfer exhausted window metric may include a total time, during a bulk data transfer time, when two packets are transmitted in one direction for greater than the predetermined time (e.g., ten milliseconds) and under a low or zero window state. A connection may enter a low or zero window state when a reported receive window size drops below 25% of the low window size state. In some implementations, the bulk data transfer time metric may include a total of time periods of sustained data transfer (e.g., in milliseconds).

In some implementations, the network delay metrics may include metrics that provide indications of the network delay experienced in the network. For example, the network delay metrics may include a round trip network delay (RTND) metric, a connections metric, a connection establishment failure count metric, a connection establishment failure time metric, a connection establishment delay time metric, a connection establishment delay count metric, a connection establishment delay (SynAckBeforeSyn) count metric, a retransmissions metric, a data transfer time metric, a data transfer retransmission time metric, a data transfer bytes metric, a retransmitted packets metric, a total packets metric, a data packets metric, and/or the like.

In some implementations, the RTND metric may include an observed minimum time for a packet to travel from one end of a connection and back. In such implementations, inter-packet times during connection setup and data-less acknowledgment (ACK) packets may be used to determine a minimum RTND. In some implementations, the connections metric may include a total quantity of connections used, in aggregate, to determine the RTND. In some implementations, the connection establishment failure count metric may include a quantity of connections to the server device that time out before seeing any data packets in either direction. In some implementations, the connection establishment failure time metric may include a total time between a first packet and a last identified packet for a failed connection (e.g., a connection to the server device that times out before seeing any data packets in either direction). In some implementations, the connection establishment delay time metric may include an amount of time to establish a connection (e.g., measured from a first synchronize (SYN) packet to a final ACK packet in a three-way handshake). In some implementations, the connection establishment delay count metric may include a quantity of established connections that satisfy the connection establishment delay time metric. In some implementations, the connection establishment delay SynAckBeforeSyn count metric may include a quantity of established connections where a SYN-ACK packet is identified before a SYN retransmission packet in the three-way handshake, and a quantity of established connections that include a single SYN packet.

In some implementations, the retransmissions metric may provide an indication of an impact of retransmitted packets on the network. In some implementations, the data transfer time metric may include a cumulative amount of time (e.g., in milliseconds) that a connection is delivering data packets (e.g., the amount time from a first data packet sent after an application turn to a last data packet or a data-less ACK packet from another direction). In some implementations, the data transfer retransmission time metric may be the same as the data transfer time metric but for intervals with one or more retransmitted data packets. In some implementations, the data transfer bytes metric may include a quantity of data transfer bytes for data transfer time intervals with retransmitted packets. In some implementations, the retransmitted packets metric may include a total quantity of retransmitted data packets for intervals identified by the data transfer retransmission time metric. In some implementations, the total packets metric may include a total quantity of data packets (e.g., including retransmitted data packets) for intervals identified by the data transfer retransmission time metric. In some implementations, the data packets metric may include a quantity of data packets for both directions between the server device and the client device.

In some implementations, the server delay metrics may include metrics that provide indications of the server delay experienced at the server device. For example, the server delay metrics may include the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like.

In some implementations, the application delay metrics may include metrics that provide indications of the application delay experienced at the application and/or the server device. For example, the application delay metrics may include an application response time metric, a total application turn delay metric, a total transaction time metric, the connections metric, a high application turn rate metric, an application turn RTND total metric, an application data in-flight metric, a transfer opportunity delay metric, and/or the like.

In some implementations, the application response time metric may include a total amount of application delays (e.g., associated with the client device and the server device) occurring at a beginning application turn that acknowledges a maximum expected ACK packet in an opposite direction. The application response time metric may include a total transaction time from a first client device packet to a last server device packet. In some implementations, the total application turn delay metric may include a total amount of application delays associated with packets at a start of the client device or the server device application turn. In some implementations, the total transaction time metric may include a total of all application turn transaction time measurements, as measured from a first client device request packet to a last server device response packet. In some implementations, the high application turn rate metric may include a measure of an impact that the RTND has on a connection. In some implementations, the application turn RTND total metric may include a total of RTND for all recorded transactions. In some implementations, the application data in-flight metric may include an amount of time the application should have been keeping data in-flight (e.g., a delay caused by the application when the application could have used the network to transfer data). In some implementations, the transfer opportunity delay metric may include a total amount of time that data should have been kept in-flight by the application.

In some implementations, the scoring platform may handle thousands, millions, billions, or more metrics received from hundreds, thousands, or more client devices, server devices, applications, and/or networks, and thus, addresses a big data issue.

In this way, the scoring platform may receive the client delay metrics, the network delay metrics, the server delay metrics, and the application delay metrics.

As further shown in FIG. 4, process 400 may include calculating client delay scores based on the client delay metrics (block 420). For example, the scoring platform (e.g., using computing resource 224, processor 320, memory 330, storage component 340, and/or the like) may calculate client delay scores based on the client delay metrics. In some implementations, the scoring platform may calculate a client exhausted windows score based on the client delay metrics. In some implementations, the scoring platform may utilize the window exhaustion metric, the bulk data transfer exhausted window metric, the bulk data transfer time metric, and/or the like, to calculate the client exhausted windows score, as described elsewhere herein. In some implementations, the client exhausted windows score may provide a measure of delay associated with exhausted windows experienced by the client device.

In some implementations, the scoring platform may assign a maximum value (e.g., 5.0) to the client exhausted windows score based on an effect of the score on the end user experience (e.g., as determined by the scoring platform). In some implementations, the scoring platform may calculate the client exhausted windows score when a particular value of the bulk data transfer exhausted window metric is greater than a threshold value (e.g., two seconds). In some implementations, the scoring platform may utilize a scale value that is determined based on a percent ratio (e.g., determined by dividing the bulk data transfer exhausted window metric by the bulk data transfer time metric) when calculating the client exhausted windows score. In some implementations, the scale value may be in a range of zero (e.g., for a percent ratio of 20%) to one (e.g., for a percent ratio of 90%). In some implementations, the scoring platform may multiply the maximum value (e.g., 5.0), of the client exhausted windows score, and the scale value (e.g., 0 to 1) to calculate the final client exhausted windows score (e.g., 0 to 5).

In this way, the scoring platform may calculate the client delay scores based on the client delay metrics.

As further shown in FIG. 4, process 400 may include calculating network delay scores based on the network delay metrics (block 430). For example, the scoring platform (e.g., using computing resource 224, processor 320, memory 330, storage component 340, and/or the like) may calculate network delay scores based on the network delay metrics. In some implementations, the scoring platform may calculate a network RTND score, a network connection establishment failure score, a network connection establishment delay score, a network retransmissions score, and/or a network slow data transfer rate score based on the network delay metrics. In some implementations, the scoring platform may utilize the RTND metric, the connections metric, the connection establishment failure count metric, the connection establishment failure time metric, the connection establishment delay time metric, the connection establishment delay count metric, the connection establishment delay SynAck-BeforeSyn count metric, the retransmissions metric, the data transfer time metric, the data transfer bytes metric, the retransmitted packets metric, the total packets metric, the data packets metric, and/or the like, to calculate the network RTND score, the network connection establishment failure score, the network connection establishment delay score, the network retransmissions score, and/or the network slow data transfer rate score.

In some implementations, the network RTND score may provide a measure of an amount of time it takes a packet to travel from one end of a connection and back (e.g., from the server device, to the client device, and back to the server device). In some implementations, the scoring platform may assign a maximum value (e.g., 2.0) to the network RTND score, may assign a minimum RTND value (e.g., 100), and may assign a maximum RTND value (e.g., 400) based on effects of the scores on the end user experience (e.g., as determined by the scoring platform). In some implementations, the scoring platform may calculate an average RTND by dividing the RTND metric by the connections metric. If the average RTND is greater than the maximum RTND value (e.g., 400), the scoring platform may assign the maximum value (e.g., 2.0) to the network RTND score. If the average RTND is less than the minimum RTND value (e.g., 100), the scoring platform may assign a zero (0.0) value to the network RTND score. If the average RTND is greater than the minimum RTND value (e.g., 100) and less than the maximum RTND value (e.g., 400), the scoring platform may calculate the network RTND score as follows:

$$\text{Network } RTND \text{ score} = \text{Max value} \times \frac{\text{Avg } RTND - \text{Min } RTND \text{ value}}{\text{Max } RTND \text{ value} - \text{Min } RTND \text{ value}}.$$

In some implementations, the network connection establishment failure score may provide a measure of connections that never fully establish and have at least one SYN+ACK packet from the server device and no data packets between the client device and the server device. In some implementations, the scoring platform may assign a maximum value (e.g., 10.0) to the network connection establishment failure score based on an effect of the score on the end user experience (e.g., as determined by the scoring platform). In some implementations, the scoring platform may determine the network connection establishment failure score based on a connection failure time. For example, if the connection failure time is within a predetermined range (e.g., 0.0 seconds to 0.5 seconds), the scoring platform may assign a particular value (e.g., 5.0) to the network connection establishment failure score. If the connection failure time is greater than a predetermined time (e.g., 10 seconds), the scoring platform may assign another particular value (e.g., 10.0) to the network connection establishment failure score. If the connection failure time is within another predetermined range (e.g., 0.5 seconds to 10 seconds), the scoring platform may assign a linear value (e.g., between 5.0 and 10.0), that linearly depends on the connection failure time (e.g., values of 5.0 and 10.0 correspond to connection failure times of 0.5 seconds and 10 seconds, respectively), to the network connection establishment failure score. In some implementations, the scoring platform may scale the network connection establishment failure score downward based on a percentage of connections that failed. For example, the scoring platform may multiply the network connection establishment failure score by a scaling factor (e.g., from 0.0 to 1.0, where 0.0 corresponds to 0.1% of connections that failed and 1.0 corresponds to 20% of connections that failed).

In some implementations, the network connection establishment delay score may be related to a connection establishment time. In some implementations, the scoring platform may assign a maximum value (e.g., 4.0) to the network connection establishment delay score based on an effect of the score on the end user experience (e.g., as determined by the scoring platform). In some implementations, the network establishment delay score may be attributed to the network when the server device sends a SYN-ACK packet followed by the client device sending a SYN packet (e.g., since the network may drop the SYN-ACK packet, which requires the client device to resend the SYN packet). In some implementations, the scoring platform may assign a linear value (e.g., between 0.0 and 4.0), that linearly depends on an average connection establishment time (e.g., values of 0.0 and 4.0 correspond to average connection establishment times of 500 milliseconds and 15,000 milliseconds, respectively), to the network connection establishment delay score. In some implementations, the scoring platform may attribute the network connection establishment delay score to the network and the server device based a percentage of connections that had SYN-ACK packets preceding a retransmitted SYN packet. In some implementations, the scoring platform may multiply the network connection establishment delay score by a weighting factor (e.g., from 0.0 to 1.0).

In some implementations, the network retransmissions score may provide a measure of an impact of retransmissions on network throughput (e.g., on sustained data transfer rates of the network). In some implementations, the scoring platform may assign a maximum value (e.g., 5.0) to the network retransmissions score based on an effect of the score on the end user experience (e.g., as determined by the scoring platform). In some implementations (e.g., when the network has low latency), if the scoring platform determines that the RTND is low (e.g., less than one millisecond), a quantity of retransmissions is very high (e.g., greater than five retransmitted packets and more than 1% of the total packets are retransmitted packets), individual data transfer times are high (e.g., greater than two seconds), and throughput during transfer is low (e.g., less than 100 megabits per second (Mbps)), the scoring platform may increase the network retransmissions score (e.g., based on the percent of the total packets that are retransmitted packets) up to the maximum value. In some implementations (e.g., when the network has high latency), if the scoring platform determines that the RTND is high (e.g., greater than or equal to one millisecond), the quantity of retransmissions is elevated (e.g., greater than five retransmitted packets and more than 0.01% of the total packets are retransmitted packets), individual data transfer times are high (e.g., greater than two seconds), and throughput during transfer is low (e.g., less than 10 Mbps), the scoring platform may increase the network retransmissions score (e.g., based on the percent of the total packets that are retransmitted packets) up to the maximum value. In some implementations, if the scoring platform determines that the server device is busy (e.g., a cause of the retransmissions), the scoring platform may attribute some or all of the network retransmissions score to the server device.

In some implementations, the network slow data transfer rate score may provide a measure of slow data transfer by the network. Slow data transfer may be noticeable to end users if an amount of data being transferred is large, and may be caused by low bandwidth, high congestion, retransmissions, TCP slow start, TCP window exhaustion, and/or the like. In some implementations, the scoring platform may assign a maximum value (e.g., 5.0) to the network slow data transfer rate score based on an effect of the score on the end user experience (e.g., as determined by the scoring platform). In some implementations, the scoring platform may calculate an average data transfer time (Avg_DTT) by dividing a data transfer time by a quantity of connections, and may calculate an average data transfer count by dividing a quantity of packets (e.g., provided in both directions between the server device and the client device) by the quantity of connections. In some implementations, the scoring platform may calculate an average data transfer bytes by dividing the quantity of data transfer bytes (DTB), for data transfer time intervals with retransmitted packets, by the quantity of connections. In some implementations, the scoring platform may calculate an achieved transfer rate (ATR) as follows:

$$ATR = DTB \times 8 / Avg\_DTT / 1000.$$

In some implementations, when the average data transfer time is greater than a value (e.g., two seconds), the average data transfer count is greater than or equal to a value (e.g., ten), and the average data transfer bytes is greater than or equal to a value (e.g., 10,000), the scoring platform may assign a value (e.g., 0.0 to 5.0) to the network slow data transfer rate score. In some implementations, when the RTND is greater than a value (e.g., five milliseconds), the scoring platform may determine that the network includes a slow transfer speed, may determine a minimum preferred transfer rate (PTR) (e.g., 10 Mbps), and may increase the network slow data rate score for any network speeds less than the minimum preferred transfer rate. In some implementations, when the RTND is less than a value (e.g., one millisecond), the scoring platform may determine that the network includes a faster low-latency connection, may determine another minimum preferred transfer rate (e.g., 100 Mbps), and may increase the network slow data rate score for any network speeds less than the other minimum preferred transfer rate. In some implementations, when the RTND is greater than or equal to one millisecond and less than or equal to five milliseconds, the scoring platform may use the following to calculate the minimum PTR:

$$PTR = \left(1 - \frac{(RTND - RTND2)}{RTND1 - RTND2}\right) * (PTR1 - PTR2) + PTR1,$$

where RTND1=5, RTND2=1, PTR1=10, and PTR2=100. Thus, the scoring platform may calculate a minimum PTR, for a RTND of two, to be PTR(RTND=2)=(1−((2−1)/(5−1)))*(100−10)+10=77.5 Mbps, may calculate a minimum PTR, for a RTND of three, to be PTR(RTND=3)=(1−((3−1)/(5−1)))*(100−10)+10=55.0 Mbps, and may calculate a minimum PTR, for a RTND of four, to be PTR(RTND=4)=(1−((4−1)/(5−1)))*(100−10)+10=32.5 Mbps. In some implementations, given a measured RTND, an achieved transfer rate (ATR), and a minimum preferred transfer rate (PTR) for a connection, the scoring platform may calculate the network slow data transfer rate (NSDT) score as follows:

$$NSDT\ score = pow\left(\frac{(PTR - ATR)}{PTR}, 4\right) * 5.0$$

In some implementations, for achieved transfer rate values greater than the minimum preferred transfer rate (e.g., ATR>PTR), the scoring platform may not utilize the aforementioned equation and may set the network slow data transfer rate score to zero.

In this way, the scoring platform may calculate the network delay scores based on the network delay metrics.

As further shown in FIG. 4, process 400 may include calculating server delay scores based on the server delay metrics (block 440). For example, the scoring platform (e.g., using computing resource 224, processor 320, memory 330, storage component 340, and/or the like) may calculate server delay scores based on the server delay metrics. In some implementations, the scoring platform may calculate a server exhausted windows score, a server connection establishment failure score, and/or a server connection establishment delay score based on the server delay metrics. In some implementations, the scoring platform may utilize the window exhaustion metric, the bulk data transfer exhausted window metric, the bulk data transfer time metric, the connections metric, the connection establishment failure count metric, the connection establishment failure time metric, the connection establishment delay time metric, the connection establishment delay count metric, the connection establishment delay SynAckBeforeSyn count metric, and/or the like, to calculate the server exhausted windows score, the server connection establishment failure score, and/or the server connection establishment delay score.

In some implementations, the scoring platform may assign a maximum value (e.g., 5.0) to the server exhausted windows score based on an effect of the score on the end user experience (e.g., as determined by the scoring platform). In some implementations, the scoring platform may calculate the server exhausted windows score when a particular value of the bulk data transfer exhausted window metric is greater than a threshold value (e.g., two seconds). In some implementations, the scoring platform may utilize a scale value that is determined based on a percent ratio (e.g., determined by dividing the bulk data transfer exhausted window metric by the bulk data transfer time metric) when calculating the server exhausted windows score. In some implementations, the scale value may be in a range of zero (e.g., for a percent ratio of 20%) to one (e.g., for a percent ratio of 90%). In some implementations, the scoring platform may multiple the maximum value (e.g., 5.0), of the server exhausted windows score, and the scale value (e.g., 0 to 1) to calculate the final server exhausted windows score (e.g., 0 to 5).

In some implementations, the server connection establishment failure score may provide a measure of connections that never fully establish and have at least one SYN+ACK packet from the server device and no data packets between the client device and the server device. In some implementations, the scoring platform may assign a maximum value (e.g., 2.0) to the server connection establishment failure score based on an effect of the score on the end user experience (e.g., as determined by the scoring platform). In some implementations, the scoring platform may determine the server connection establishment failure score based on a connection failure time. For example, if the connection failure time is within a predetermined range (e.g., 0.0 seconds to 0.5 seconds), the scoring platform may assign a particular value (e.g., 0.0) to the server connection establishment failure score. If the connection failure time is greater than a predetermined time (e.g., 10 seconds), the scoring platform may assign another particular value (e.g., 2.0) to the server connection establishment failure score. If the connection failure time is within another predetermined range (e.g., 0.5 seconds to 10 seconds), the scoring platform may assign a linear value (e.g., between 0.0 and 2.0), that linearly depends on the connection failure time (e.g., values of 0.0 and 2.0 correspond to connection failure times of 0.5 seconds and 10 seconds, respectively), to the server connection establishment failure score. In some implementations, the scoring platform may scale the server connection establishment failure score downward based on a percentage of connections that failed. For example, the scoring platform may multiply the server connection establishment failure score by a scaling factor (e.g., from 0.0 to 1.0, where 0.0 corresponds to 0.1% of connections that failed and 1.0 corresponds to 20% of connections that failed).

In some implementations, the server connection establishment delay score may be related to a connection establishment time. In some implementations, the scoring platform may assign a maximum value (e.g., 4.0) to the server connection establishment delay score based on an effect of the score on the end user experience (e.g., as determined by the scoring platform). In some implementations, the scoring platform may assign a linear value (e.g., between 0.0 and 4.0), that linearly depends on an average connection establishment time (e.g., values of 0.0 and 4.0 correspond to average connection establishment times of 500 milliseconds and 15,000 milliseconds, respectively), to the server connection establishment delay score. In some implementations, the scoring platform may attribute the server connection establishment delay score to the network and the server device based a percentage of connections that had SYN-ACK packets preceding a retransmitted SYN packet. In some implementations, the scoring platform may multiply the server connection establishment delay score by a weighting factor (e.g., from 0.0 to 1.0).

In this way, the scoring platform may calculate the server delay scores based on the server delay metrics.

As further shown in FIG. 4, process 400 may include calculating application delay scores based on the application delay metrics (block 450). For example, the scoring platform (e.g., using computing resource 224, processor 320, memory 330, storage component 340, and/or the like) may calculate application delay scores based on the application delay metrics. In some implementations, the scoring platform may calculate an application response time score, an application turn rate score, and/or an application data in flight score based on the application delay metrics. In some implementations, the scoring platform may utilize the application response time metric, the total application turn delay metric, the total transaction time metric, the connections metric, the high application turn rate metric, the application turn RTND total metric, the application data in-flight metric, the transfer opportunity delay metric, and/or the like, to calculate the application response time score, the application turn rate score, and/or the application data in flight score.

In some implementations, the application response time score may provide a measure of application delays, experienced by the client device and/or the server device, at a beginning of every application turn. A total transaction time may be included in the application response time score, and may include an amount of time from a first client device data packet to a last server device data packet, and any application delay at the client device. In some implementations, the scoring platform may assign a maximum value (e.g., 4.0) to the application response time score based on an effect of the score on the end user experience (e.g., as determined by the scoring platform). In some implementations, the scoring platform may calculate an initial application response time score based on a sum of all application turn delays measurements. In some implementations, the scoring platform may linearly assign the application response time score based on the application turn delays (e.g., a delay of two seconds may be assigned a score of 0.01, a delay of thirty second may be assigned a score of 4.0, and/or the like). In some implementations, the scoring platform may scale the application response time score based on a ratio of the application turn delays and the transaction time. The ratio may linearly assign a scale factor from a first ratio (e.g., 25% may assign a 0.0 scale factor) to a second ratio (e.g., 75% may assign a 1.0 scale factor). For ratios below the first ratio, the scoring platform may assign a zero value (0.0) to the application response time score. For ratios above the second ratio, the scoring platform may assign the maximum value (e.g., 4.0) to the application response time score based on an effect of the score on the end user experience (e.g., as determined by the scoring platform).

In some implementations, the application turn rate score may provide a measure of impacts that round trip network delays have on a connection. In some implementations, the application turn rate score may indicate that the application includes many application turns which cause the application to operate inefficiently and create longer wait times. In some implementations, the scoring platform may assign a maximum value (e.g., 5.0) to the application turn rate score based on an effect of the score on the end user experience (e.g., as determined by the scoring platform). In some implementations, the scoring platform may increase the application turn rate score if the scoring platform determines that a cumulative application turn overhead (e.g., determined by multiplying an application turn count and the RTND) is high (e.g., greater than two seconds), a quantity of application turns for a connection is high (e.g., greater than ten), the RTND is high (e.g., greater than one millisecond), and a ratio of the application turn overhead to a total wait time is high (e.g., greater than twenty percent).

In some implementations, the application data in flight score may provide a measure of an amount of time the application should have been keeping data in flight. In some implementations, the application data in flight score may indicate a delay caused by the application when the application could have used the network to transfer data. In some implementations, the scoring platform may assign a maximum value (e.g., 4.0) to the application data in flight score based on an effect of the score on the end user experience (e.g., as determined by the scoring platform). In some implementations, the scoring platform may increase the application data in flight score if the scoring platform determines that a number of unacknowledged bytes in flight go to zero during a data transfer, more data is transmitted in a same direction (e.g., a client device direction or a server device direction) without another request being identified, an inter-packet time is abnormally large (e.g., greater than ten milliseconds), and a cumulative transfer opportunity delay (e.g., a time that data should have been in flight, as determined based on adding the RTND and a time that unacknowledged bytes are in flight) is high (e.g., greater than two seconds). In some implementations, the scoring platform may increase the application data in flight score as the cumulative transfer opportunity delay increases.

In this way, the scoring platform may calculate the application delay scores based on the application delay metrics.

As further shown in FIG. 4, process 400 may include generating a final end user experience (EUE) score based on the client delay scores, the network delay scores, the server delay scores, and the application delay scores (block 460). For example, the scoring platform (e.g., using computing resource 224, processor 320, memory 330, storage component 340, and/or the like) may generate a final end user experience (EUE) score based on the client delay scores, the network delay scores, the server delay scores, and the application delay scores. In some implementations, the scoring platform may set the initial score to a particular value (e.g., 10.0), and may deduct the client delay scores, the network delay scores, the server delay scores, and the application delay scores, from the particular value, to generate the final score.

In some implementations, the scoring platform may utilize the client exhausted windows score as the client delay scores. In some implementations, the scoring platform may add the network RTND score, the network connection establishment failure score, the network connection establishment delay score, the network retransmissions score, and the network slow data transfer rate score to determine the network delay scores. In some implementations, the scoring platform may add the server exhausted windows score, the server connection establishment failure score, and the server connection establishment delay score to determine the server delay scores. In some implementations, the scoring platform may add the application response time score, the application turn rate score, and the application data in flight score to determine the application delay scores.

In some implementations, the scoring platform may determine the final score based on a scale (e.g., a scale from 0.0 to 10.0), and may determine the end user experience based on the final score. In some implementations, the scoring platform may determine that a final score of less than or equal to a particular value (e.g., 5.0) indicates a poor end user experience caused by one or more of the client device, the server device, the application, or the network. In some implementations, the scoring platform may determine that a final score between a particular range (e.g., 5.1 and 8.0) indicates a marginal end user experience caused by one or more of the client device, the server device, the application, or the network. In some implementations, the scoring platform may determine that a final score of greater than a particular value (e.g., 8.0) indicates a good end user experience involving one or more of the client device, the server device, the application, or the network.

In some implementations, the scoring platform may determine the final score on a different scale (e.g., a scale from 0 to 100), where a final score of less than or equal to a particular value (e.g., 50) indicates a poor end user experience, a final score within a particular range (e.g., between 51 and 80) indicates a marginal end user experience, and a final score of greater than a particular value (e.g., 80) indicates a good end user experience.

In some implementations, the scoring platform may define the client delay scores, the network delay scores, the server delay scores, and the application delay scores so that the scoring platform can quantify an impact of one or more metrics on one or more of the client delay scores, one or more of the network delay scores, one or more of the server delay scores, and/or one or more of the application delay scores.

In some implementations, the scoring platform may utilize the received metrics and/or auxiliary information to bias the client delay scores, the network delay scores, the server delay scores, and/or the application delay scores toward a particular area. For example, if the scoring platform determines that the server device is experiencing zero windows, then the scoring platform may determine that the zero windows indicate server device slowness. However, the scoring platform may, instead, determine that such slowness is due to the application rather than and the server device. In another example, if the scoring platform determines that the server device includes an unusually high number of connections, the scoring platform may bias the application delay scores toward the server delay scores.

In some implementations, the scoring platform may train one or more machine learning models (e.g., to generate one or more trained machine learning models) by providing historical metrics and historical final scores to the one or more machine learning models, and receiving predictions of rules (e.g., rules explaining the historical final scores given the historical metrics) based on providing the historical metrics and the historical final scores to the one or more machine learning models. Based on the predictions of rules, the scoring platform may update the one or more machine learning models, and may provide the historical metrics and the historical final scores to the updated one or more machine learning models. The scoring platform may repeat this process until correct predictions of rules are generated by the one or more machine learning models.

In some implementations, the scoring platform may process one or more of the metrics, with the one or more machine learning models, to generate previously unknown final scores.

In some implementations, the one or more machine learning models may include one or more of a support vector machine model, a linear regression model, a least absolute shrinkage and selection operator (Lasso) regression model, a Ridge regression model, an Elastic Net model, a k-nearest neighbor model, and/or the like.

The support vector machine model may include a supervised learning model with one or more associated learning algorithms that analyze data used for classification and regression analysis. Given a set of training examples, where each training example is marked as belonging to one or the other of two categories, a support vector machine training algorithm builds a model that assigns new examples to one category or the other. The support vector machine model is a representation of the examples as points in space, mapped so that the examples of the separate categories are divided by a clear gap that is as wide as possible. New examples are then mapped into that same space and predicted to belong to a category based on which side of the gap they fall.

The linear regression model may employ a linear approach for modeling a relationship between a scalar dependent variable (y) and one or more independent or explanatory variables (x). In a linear regression model, relationships are modeled using linear predictor functions whose unknown model parameters are estimated from data. In some implementations, a conditional mean of y given a value of x may be assumed to be an affine function of x. Additionally, or alternatively, a median or another quantile of a conditional distribution of y given x is expressed as a linear function of x. The linear regression model focuses on a conditional probability distribution of y given x, rather than on joint probability distribution of y and x, which is a domain of multivariate analysis.

The Lasso regression model may include a model that employs a shrinkage and variable selection method. The shrinkage and variable selection method may include a regression analysis method that performs both variable selection and regularization in order to enhance the prediction accuracy and interpretability of a statistical model produced by the regression analysis method. The Lasso regression model seeks to obtain a subset of predictors that minimizes prediction error for a quantitative response variable by imposing a constraint on model parameters that causes regression coefficients for some variables to shrink toward zero. Variables with a regression coefficient equal to zero after the shrinkage process are excluded from the model, while variables with non-zero regression coefficients are most strongly associated with the response variable. The Lasso regression model applies a penalty (known as an L1 penalty) equal to the absolute value of the magnitude of coefficients.

The Ridge regression model may include a model for analyzing multiple regression data that suffers from multicollinearity. Multicollinearity occurs when there is a near-linear relationship among independent variables, which can cause regression analysis to involve a division by zero (which causes calculations to be aborted) or division by a very small number (which can cause significant distortion of results). When multicollinearity occurs, least squares estimates are unbiased, but variances are large so they may be far from a true value. By adding a degree of bias to regression estimates, the Ridge regression model reduces standard errors in order to provide estimates that may be more reliable. The Ridge regression model applies a penalty (known as an L2 penalty) equal to a square of a magnitude of coefficients.

The Elastic Net model may include a variant of the Lasso regression model that employs elastic net regularization to add a penalty which improves performance when a number of predictors is larger than a sample size, allows the model to select strongly correlated variables together, and improves overall prediction accuracy. Regularization is a way to avoid overfitting by penalizing high-valued regression coefficients. The Elastic Net model utilizes a regularized regression method that linearly combines an L1 penalty (equal to an absolute value of a magnitude of coefficients) used by the Lasso model and an L2 penalty (equal to a square of the magnitude of coefficients) used by the Ridge regression model.

The k-nearest neighbor model may include a model that employs a k-nearest neighbor algorithm to perform machine learning. The k-nearest neighbor algorithm is a non-parametric method that may be used for classification (where an output is a class membership) in which an object is classified by a majority vote of its neighbors, with an object being assigned to a class most common among its k-nearest neighbors, or may be used for regression (where an output is a property value for the object) in which a value is an average of values of its k-nearest neighbors. Additionally, weights may be assigned to contributions of the neighbors, so that nearer neighbors contribute more to the average of the values than more distant neighbors.

In some implementations, the scoring platform may calculate the client delay scores, the network delay scores, the server delay scores, and the application delay scores based on the metrics described herein and/or based on other metrics. For example, the scoring platform may calculate the client delay scores, the network delay scores, the server delay scores, and/or the application delay scores based on other metrics, such as comparative or baseline information associated with the client device, the server device, the network, and/or the application; rules derived from machine learning; error codes associated with the client device, the server device, the network, and/or the application; detection of potential security threats associated with the client device, the server device, the network, and/or the application; higher level measurements (e.g., a connection count of the serve device dramatically increases over a baseline, aggregate many connections together rather than using a single connection, etc.), unified communications (e.g., voice of Internet protocol (VoIP) and video over IP), and/or the like.

In some implementations, the scoring platform may enable a user of the scoring platform to define one or more other metrics to utilize in the calculation of the client delay scores, the network delay scores, the server delay scores, and/or the application delay scores. For example, the scoring platform may provide a user interface (e.g., for display) that enables the user to define the one or more other metrics. In such implementations, the scoring platform may enable the user (e.g., via the user interface) to configure maximum values (e.g., thresholds) for one or more of the client delay scores, one or more of the network delay scores, one or more of the server delay scores, and/or one or more of the application delay scores. In this way, the scoring platform may enable the user to provide more metrics for the calculation of the final score, which may improve the calculation of the final score.

In some implementations, the scoring platform may differently weight one or more of the client delay scores, one or more of the network delay scores, one or more of the server delay scores, and/or one or more of the application delay scores when calculating the final score. In such implementations, the scoring platform may apply different weights to one or more of the client delay scores, one or more of the network delay scores, one or more of the server delay scores, and/or one or more of the application delay scores. In some implementations, the scoring platform may apply the different weights based on adjusting the maximum values (e.g., thresholds) for one or more of the client delay scores, one or more of the network delay scores, one or more of the server delay scores, and/or one or more of the application delay scores. In some implementations, the scoring platform may determine the different weights based on historical metrics associated with the client device, the server device, the network, and the application. For example, assume that the historical metrics indicate that the end user experience is degraded a first percentage (e.g., 10%) by the client device, a second percentage (e.g., 30%) by the server device, a third percentage (e.g., 40%) by the network, and a fourth percentage (e.g., 20%) by the application. In such an example, the scoring platform may apply a weight of 0.1 to the client delay score, a weight of 0.3 to the server delay scores, a weight of 0.4 to the network delay scores, and a weight of 0.2 to the application delay scores when calculating the final score.

In some implementations, the scoring platform may aggregate the determined at a high level, such as an overall site score, a subnet score, an application score, a server device score, a network score, and/or the like. The aggregation may include an average of the scores, or may be determined based on weighting, statistical analysis, baselining, and/or the like. Such an aggregated score may provide a top-to-bottom workflow to highlight any sites, subnets, applications, server devices, networks, and/or the like, that are experiencing systemic problems and deserve attention. As a user drills down into the aggregated score, the scoring platform may provide a next level of detail to narrow down a root cause of a problem.

In some implementations, the scoring platform may correlate the scores based on time and/or space. For example, if the server device is associated with a poor score for a particular client device, the scoring platform can isolate a time period of poor performance, and determine other server devices with which the particular client device was interacting during that time period. The scoring platform may utilize this information to associate specific back-end communications as a cause of trouble for the particular client device during the time period.

In some implementations, the scoring platform may utilize phase-in and/or phase-out ramps for the delay scores, described herein, in order provide fewer delay scores that are exactly zero or ten, as well as to provide a total ordering among metrics that are beyond an upper end of a scoring threshold. In some implementations, the scoring platform may analyze delay scores in two or more different ways, and may utilize a maximum score of the two different ways.

In this way, the scoring platform may generate a final end user experience (EUE) score based on the client delay scores, the network delay scores, the server delay scores, and the application delay scores.

As further shown in FIG. 4, process 400 may include performing an action based on the final EUE score, the client delay scores, the network delay scores, the server delay scores, and/or the application delay scores (block 470). For example, the scoring platform (e.g., using computing resource 224, processor 320, memory 330, storage component 340, and/or the like) may perform an action based on the final EUE score, the client delay scores, the network delay scores, the server delay scores, and/or the application delay scores. In some implementations, the scoring platform may generate information associated with the final EUE score, the client delay scores, the network delay scores, the server delay scores, and the application delay scores. In some implementations, the scoring platform may generate information indicating the final score and whether the final score indicates a poor end user experience, a marginal end user experience, a good end use experience, and/or the like.

In some implementations, the scoring platform may highlight the information indicating the final EUE score via different text sizes, different text fonts, italicizing, bolding, different colors, and/or the like. In such implementations, the highlighting of the information indicating the final EUE score may provide an indication of whether the final EUE score is poor, marginal, good, and/or the like. For example, the scoring platform may generate a red-colored final EUE score when the final EUE score is poor, a yellow-colored final EUE score when the final EUE score is marginal, and a green-colored final EUE score when the final EUE score is good, and/or the like. In this way, the scoring platform can visually provide a quick way to determine whether the final EUE is poor, marginal, or good.

In some implementations, the scoring platform may generate information indicating the final EUE score, a total of the client delay scores, a total of the network delay scores, a total of the server delay scores, and a total of the application delay scores. In such implementations, the information (e.g., when provided for display) may be selectable by a user of the scoring platform (e.g., an entity responsible for the client device, the server device, the application, and/or the network). For example, the user may select the total of the client delay scores, and the scoring platform may provide information indicating each of the client delay scores making up the total of the client delay scores. In another example, the user may select the total of the network delay scores, and the scoring platform may provide information indicating each of the network delay scores making up the total of the network delay scores. In still another example, the user may select the total of the server delay scores, and the scoring platform may provide information indicating each of the server delay scores making up the total of the server delay scores. In a further example, the user may select the total of the application delay scores, and the scoring platform may provide information indicating each of the application delay scores making up the total of the application delay scores. In this way, the user may drill down through the information in order to determine which scores had the most impact on the final EUE score. For example, if the server delay scores are high, the user may drill down into the server delay scores to determine which server delay score contributed the most to the high server delay scores.

In some implementations, the scoring platform may provide the information associated with the final score, the client delay scores, the network delay scores, the server delay scores, and/or the application delay scores for display to a user of the scoring platform (e.g., via a user interface). For example, the scoring platform may generate a user interface that includes information indicating the final EUE score, the client delay scores, the network delay scores, the server delay scores, the application delay scores, and/or the like.

In some implementations, the scoring platform may determine one or more actions to perform based on the final EUE score, the client delay scores, the network delay scores, the server delay scores, and/or the application delay scores, and may cause the one or more actions to be implemented.

For example, in some implementations, the scoring platform may identify one or more issues in the client device based on the client delay scores, and may determine one or more actions to the correct the one or more issues, such as restart the client device, provide updated software to the client device, remove software from the client device, add hardware (e.g., processors, memory, etc.) to the client device, and/or the like. In such implementations, the scoring platform may automatically perform the one or more actions, or may cause the one or more actions to be performed. In such implementations, performance of the one or more actions may modify (e.g., reduce) the client delay scores.

In some implementations, the scoring platform may identify one or more issues in the server device based on the server delay scores, and may determine one or more actions to the correct the one or more issues, such as restart the server device, provide updated software to the server device, remove software from the server device, replace the server device, add hardware (e.g., processors, memory, etc.) to the server device, and/or the like. In such implementations, the scoring platform may automatically perform the one or more actions, or may cause the one or more actions to be performed (e.g., dispatch a technician to perform an action). In such implementations, performance of the one or more actions may modify (e.g., reduce) the server delay scores.

In some implementations, the scoring platform may identify one or more issues in the network based on the network delay scores, and may determine one or more actions to the correct the one or more issues, such as restart one or more network devices, provide updated software to one or more network devices, remove software from one or more network devices, replace one or more network devices, add hardware (e.g., processors, memory, etc.) to one or more network devices, increase network bandwidth, add one or more network devices to the network, and/or the like. In such implementations, the scoring platform may automatically perform the one or more actions, or may cause the one or more actions to be performed. In such implementations, performance of the one or more actions may modify (e.g., reduce) the network delay scores.

In some implementations, the scoring platform may identify one or more issues in the application based on the application delay scores, and may determine one or more actions to the correct the one or more issues, such as restart the application, provide updated software for the application, remove the application from the server device, replace the application with a different application, and/or the like. In such implementations, the scoring platform may automatically perform the one or more actions, or may cause the one or more actions to be performed. In such implementations, performance of the one or more actions may modify (e.g., reduce) the application delay scores.

In this way, the scoring platform may perform an action based on the final EUE score, the client delay scores, the network delay scores, the server delay scores, and/or the application delay scores.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide a scoring platform that determines an end user experience score based on client device, network, server device, and application metrics (e.g., key performance indicators (KPIs)). For example, the scoring platform may receive client delay metrics associated with a client device, server delay metrics associated with a server device communicating with the client device, application delay metrics associated with an application executing on the server device and being utilized by the client device, and network delay metrics associated with a network interconnecting the client device and the server device. The score platform may calculate client delay scores, server delay scores, application delay scores, and network delay scores based on the client delay metrics, the server delay metrics, the application delay metrics, and the network delay metrics, respectively. The scoring platform may generate a final end user experience (EUE) score based on the client delay scores, the server delay scores, the application delay scores, and the network delay scores. The scoring platform may perform an action based on the final EUE score, the client delay scores, the server delay scores, the application delay scores, and/or the network delay scores.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, configured to:
  receive client delay metrics associated with a client device;
  receive network delay metrics associated with a network;
  receive server delay metrics associated with a server device;
  receive application delay metrics associated with an application provided by the server device,
    wherein the client device and the server device communicate via the network;
  calculate one or more client delay scores based on the client delay metrics,
    the one or more client delay scores providing first indications of delays caused by the client device;
  calculate one or more network delay scores based on the network delay metrics,
    the one or more network delay scores providing second indications of delays caused by the network;
  calculate one or more server delay scores based on the server delay metrics,
    the one or more server delay scores providing third indications of delays caused by the server device;
  calculate one or more application delay scores based on the application delay metrics,
    the one or more application delay scores providing fourth indications of delays caused by the application;
  calculate an end user experience score based on the one or more client delay scores, the one or more network delay scores, the one or more server delay scores, and the one or more application delay scores;
  generate a user interface that includes first information indicating the end user experience score and second information indicating a largest source of delay,
    the largest source of delay being identified as one of the client device, the network, the server device, or the application associated with reducing the end user experience score by a highest amount relative to others of the client device, the network, the server device, or the application; and
  selectively perform one or more actions based on the end user experience score, the second information indicating the largest source of delay, the one or more client delay scores, the one or more network delay scores, the one or more server delay scores, and/or the one or more application delay scores,
    the one or more actions including one or more of:
      one or more first actions on the client device based on the one or more client delay scores,
        the one or more first actions including one or more of:
          restarting the client device,
          providing first updated software to the client device,
          removing first software from the client device, or
          adding first hardware to the client device;
      one or more second actions on the network based on the one or more network delay scores,
        the one or more second actions including one or more of:
          restarting one or more network devices,
          providing second updated software to the one or more network devices,
          removing second software from the one or more network devices,
          replacing the one or more network devices,
          adding second hardware to the one or more network devices,
          increasing bandwidth to the one or more network devices, or
          adding one or more other network devices;
      one or more third actions on the server device based on the one or more server delay scores,
        the one or more third actions including one or more of:
          restarting the server device,
          providing third updated software to the server device,
          removing third software from the server device,
          replacing the server device, or
          adding third hardware to the server device; or
      one or more fourth actions on the application based on the one or more application delay scores,
        the one or more fourth actions including one or more of:
          restarting the application,
          providing fourth updated software for the application, removing the application from the server device, or replacing the application with another application.

2. The device of claim 1, wherein the one or more actions modify one or more of:

the one or more client delay scores, the one or more network delay scores, the one or more server delay scores, or the one or more application delay scores.

3. The device of claim 1, wherein the end user experience score provides an indication of an end user experience with the client device, the server device, the network, and the application.

4. The device of claim 1, wherein the client delay metrics include one or more of a window exhaustion metric, a bulk data transfer exhausted window metric, or a bulk data transfer time metric, and wherein, when calculating the one or more client delay scores, the one or more processors are configured to:

calculate a client exhausted windows score based on the one or more of the window exhaustion metric, the bulk data transfer exhausted window metric, or the bulk data transfer time metric.

5. The device of claim 1, wherein the network delay metrics include one or more of a round trip network delay (RTND) metric, a connections metric, connection establishment failure metrics, connection establishment delay metrics, a retransmissions metric, a data transfer time metric, a data transfer retransmission time metric, a data transfer bytes metric, a retransmitted packets metric, a total packets metric, or a data packets metric, and wherein, when calculating the one or more network delay scores, the one or more processors are configured to:

calculate a network RTND score, a network connection establishment failure score, a network connection establishment delay score, a network retransmissions score, and a network slow data transfer rate score based on the one or more of the RTND metric, the connections metric, the connection establishment failure metrics, the connection establishment delay metrics, the retransmissions metric, the data transfer time metric, the data transfer retransmission time metric, the data transfer bytes metric, the retransmitted packets metric, the total packets metric, or the data packets metric.

6. The device of claim 1, wherein the server delay metrics include one or more of a window exhaustion metric, a bulk data transfer exhausted window metric, a bulk data transfer time metric, a connections metric, connection establishment failure metrics, or connection establishment delay metrics, and wherein, when calculating the one or more server delay scores, the one or more processors are configured to:

calculate a server exhausted windows score, a server connection establishment failure score, and a server connection establishment delay score based on the one or more of the window exhaustion metric, the bulk data transfer exhausted window metric, the bulk data transfer time metric, the connections metric, the connection establishment failure metrics, or the connection establishment delay metrics.

7. The device of claim 1, wherein the application delay metrics include one or more of an application response time metric, a total application turn delay metric, a total transaction time metric, a connections metric, a high application turn rate metric, an application turn round trip network delay (RTND) total metric, an application data in-flight metric, or a transfer opportunity delay metric, and wherein, when calculating the one or more application delay scores, the one or more processors are configured to:

calculate an application response time score, an application turn rate score, and an application data in flight score based on the one or more of the application response time metric, the total application turn delay metric, the total transaction time metric, the connections metric, the high application turn rate metric, the application turn RTND total metric, the application data in-flight metric, or the transfer opportunity delay metric.

8. A non-transitory computer-readable medium storing instructions, the instructions comprising:

one or more instructions that, when executed by one or more processors, cause the one or more processors to:

receive client delay metrics, the client delay metrics providing first information associated with a client device;

receive network delay metrics, the network delay metrics providing second information associated with a network;

receive server delay metrics, the server delay metrics providing third information associated with a server device;

receive application delay metrics, the application delay metrics providing fourth information associated with an application provided by the server device, and the client device and the server device communicating via the network;

determine one or more client delay scores based on the client delay metrics, the one or more client delay scores providing first indications of delays associated with the client device;

determine one or more network delay scores based on the network delay metrics, the one or more network delay scores providing second indications of delays associated with the network;

determine one or more server delay scores based on the server delay metrics, the one or more server delay scores providing third indications of delays associated with the server device;

determine one or more application delay scores based on the application delay metrics, the one or more application delay scores providing fourth indications of delays associated with the application;

calculate an end user experience score based on the one or more client delay scores, the one or more network delay scores, the one or more server delay scores, and the one or more application delay scores;

generate a user interface that includes fifth information indicating the end user experience score and sixth information indicating a largest source of delay, the largest source of delay being identified as one of the client device, the network, the server device, or the application associated with reducing the end user experience score by a highest amount relative to others of the client device, the network, the server device, or the application; and selectively perform one or more actions based on the end user experience score, the sixth information indicating the largest source of delay, the one or more client delay scores, the one or more network delay scores, the one or more server delay scores, and/or the one or more application delay scores, the one or more actions including one or more of:
one or more first actions on the client device based on the one or more client delay scores,
the one or more first actions including one or more of:
restarting the client device,
providing first updated software to the client device,
removing first software from the client device, or
adding first hardware to the client device;
one or more second actions on the network based on the one or more network delay scores,
the one or more second actions including one or more of:
restarting one or more network devices,
providing second updated software to the one or more network devices,
removing second software from the one or more network devices,
replacing the one or more network devices,
adding second hardware to the one or more network devices,
increasing bandwidth to the one or more network devices, or
adding one or more other network devices;
one or more third actions on the server device based on the one or more server delay scores,
the one or more third actions including one or more of:
restarting the server device,
providing third updated software to the server device,
removing third software from the server device,
replacing the server device, or
adding third hardware to the server device; or
one or more fourth actions on the application based on the one or more application delay scores,
the one or more fourth actions including one or more of:
restarting the application,
providing fourth updated software for the application,
removing the application from the server device, or
replacing the application with another application.

9. The non-transitory computer-readable medium of claim 8, wherein the one or more client delay scores include a client exhausted windows score.

10. The non-transitory computer-readable medium of claim 8, wherein the one or more network delay scores include one or more of:
a network round trip network delay (RTND) score,
a network connection establishment failure score,
a network connection establishment delay score,
a network retransmissions score, or
a network slow data transfer rate score.

11. The non-transitory computer-readable medium of claim 8, wherein the one or more server delay scores include one or more of:
a server exhausted windows score,
a server connection establishment failure score, or
a server connection establishment delay score.

12. The non-transitory computer-readable medium of claim 8, wherein the one or more application delay scores include one or more of:
an application response time score,
an application turn rate score, or
an application data in flight score.

13. The non-transitory computer-readable medium of claim 8, wherein the one or more actions modify one or more of:
the one or more client delay scores,
the one or more network delay scores,
the one or more server delay scores, or
the one or more application delay scores.

14. The non-transitory computer-readable medium of claim 8, wherein the one or more instructions, that cause the one or more processors to calculate the end user experience score, cause the one or more processors to:
apply different weights to the one or more client delay scores, the one or more network delay scores, the one or more server delay scores, and the one or more application delay scores to generate one or more weighted client delay scores, one or more weighted network delay scores, one or more weighted server delay scores, and one or more weighted application delay scores; and
calculate the end user experience score based on the one or more weighted client delay scores, the one or more weighted network delay scores, the one or more weighted server delay scores, and the one or more weighted application delay scores.

15. A method, comprising:
receiving, by a device:
first metrics associated with a client device,
second metrics associated with a network,
third metrics associated with a server device, and
fourth metrics associated with an application provided by the server device,
wherein the client device and the server device communicate via the network;
calculating, by the device, one or more client delay scores based on the first metrics associated with the client device,
the one or more client delay scores providing first indications of delays associated with the client device;
calculating, by the device, one or more network delay scores based on the second metrics associated with the network,
the one or more network delay scores providing second indications of delays associated with the network;
calculating, by the device, one or more server delay scores based on the third metrics associated with the server device,
the one or more server delay scores providing third indications of delays associated with the server device;
calculating, by the device, one or more application delay scores based on the fourth metrics associated with the application, the one or more application delay scores providing fourth indications of delays associated with the application;

calculating, by the device, an end user experience score based on the one or more client delay scores, the one or more network delay scores, the one or more server delay scores, and the one or more application delay scores;

generating, by the device, a user interface that includes first information indicating the end user experience score and second information indicating a largest source of delay, the largest source of delay being identified as one of the client device, the network, the server device, or the application associated with reducing the end user experience score by a highest amount relative to others of the client device, the network, the server device, or the application; and selectively performing, by the device, one or more actions based on the end user experience score, the second information indicating the largest source of delay, the one or more client delay scores, the one or more network delay scores, the one or more server delay scores, and/or the one or more application delay scores, the one or more actions including one or more of:

one or more first actions on the client device based on the one or more client delay scores,
the one or more first actions including one or more of:
restarting the client device,
providing first updated software to the client device,
removing first software from the client device, or
adding first hardware to the client device;

one or more second actions on the network based on the one or more network delay scores,
the one or more second actions including one or more of:
restarting one or more network devices,
providing second updated software to the one or more network devices,
removing second software from the one or more network devices,
replacing the one or more network devices,
adding second hardware to the one or more network devices,
increasing bandwidth to the one or more network devices, or
adding one or more other network devices;

one or more third actions on the server device based on the one or more server delay scores,
the one or more third actions including one or more of:
restarting the server device,
providing third updated software to the server device,
removing third software from the server device,
replacing the server device, or
adding third hardware to the server device; or one or more fourth actions on the application based on the one or more application delay scores,
the one or more fourth actions including one or more of:
restarting the application,
providing fourth updated software for the application,
removing the application from the server device, or
replacing the application with another application.

16. The method of claim 15, wherein the one or more actions include one or more of:
the one or more client delay scores,
the one or more network delay scores,
the one or more server delay scores, or
the one or more application delay scores.

17. The method of claim 15, further comprising:
providing, for display via the user interface, third information indicating another one of the client device, the network, the server device, or the application as a next largest source of delay.

18. The method of claim 15, wherein the end user experience score provides an indication of an end user experience with the client device, the server device, the network, and the application.

19. The method of claim 15, wherein calculating the end user experience score comprises:
processing the first metrics associated with the client device, the second metrics associated with the network, the third metrics associated with the server device, and the fourth metrics associated with the application with one or more machine learning models; and
calculating the end user experience score based on processing the first metrics associated with the client device, the second metrics associated with the network, the third metrics associated with the server device, and the fourth metrics associated with the application with the one or more machine learning models.

20. The method of claim 19, wherein the one or more machine learning models include one or more of:
a support vector machine model,
a linear regression model,
a least absolute shrinkage and selection operator (Lasso) regression model,
a Ridge regression model,
an Elastic Net model, or
a k-nearest neighbor model.

* * * * *